US009972128B2

(12) United States Patent
Gregson et al.

(10) Patent No.: US 9,972,128 B2
(45) Date of Patent: May 15, 2018

(54) METHODS AND SYSTEMS FOR GENERATING POLYCUBES AND ALL-HEXAHEDRAL MESHES OF AN OBJECT

(71) Applicants: The University of British Columbia, Vancouver (CA); Oregon State University, Corvallis, OR (US)

(72) Inventors: James Gregson, Vancouver (CA); Alla Sheffer, Vancouver (CA); Eugene Zhang, Corvallis, OR (US)

(73) Assignees: The University of British Columbia, Vancouver (CA); Oregon State University, Corvallis, OR (US)

(*) Notice: Subject to any disclaimer, the term of this patent is extended or adjusted under 35 U.S.C. 154(b) by 759 days.

(21) Appl. No.: 13/948,016

(22) Filed: Jul. 22, 2013

(65) Prior Publication Data
US 2014/0028673 A1    Jan. 30, 2014

Related U.S. Application Data

(60) Provisional application No. 61/673,884, filed on Jul. 20, 2012.

(51) Int. Cl.
*G06T 17/20* (2006.01)
*G06T 19/20* (2011.01)

(52) U.S. Cl.
CPC ............. *G06T 17/20* (2013.01); *G06T 19/20* (2013.01); *G06T 2210/12* (2013.01); *G06T 2210/44* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 4,822,090 A | 4/1989 | Kim | |
| 4,833,310 A | 5/1989 | Shimamura et al. | |

(Continued)

FOREIGN PATENT DOCUMENTS

| | | |
|---|---|---|
| EP | 0232115 A2 | 8/1987 |
| EP | 0232115 A3 | 9/1988 |

(Continued)

OTHER PUBLICATIONS

Juncong Lin et al, Automatic PolyCube-Maps, Advances in Geometric Modeling and Processing, 5th International Conference, GMP 2008.*

(Continued)

*Primary Examiner* — Barry Drennan
*Assistant Examiner* — Diana Hickey
(74) *Attorney, Agent, or Firm* — Chernoff Vilhauer, LLC

(57) ABSTRACT

A method for generating a polycube representation of an input object comprises: receiving an input volumetric representation of the input object; deforming the input volumetric representation to provide a deformed object representation; and extracting, by the processor, a polycube representation of the object from the deformed object representation. Deforming the input volumetric representation to provide the deformed object representation comprises effecting a tradeoff between competing objectives of: deforming the input volumetric representation in a manner which provides surfaces having normal vectors closely aligned with one of the six directions aligned with the set of global Cartesian axes; and deforming the input volumetric representation in a manner which provides low-distortion deformations. Deforming the input volumetric representation to provide the deformed object may be performed iteratively.

29 Claims, 10 Drawing Sheets

(56) References Cited

U.S. PATENT DOCUMENTS

| | | | |
|---|---|---|---|
| 5,729,670 | A | 3/1998 | Strumolo et al. |
| 5,731,817 | A | 3/1998 | Hahs et al. |
| 5,768,156 | A | 6/1998 | Tautges et al. |
| 6,099,058 | A | 8/2000 | Asai et al. |
| 6,124,857 | A | 9/2000 | Itoh et al. |
| 6,259,453 | B1 | 7/2001 | Itoh et al. |
| 6,446,033 | B1 | 9/2002 | Tatsumi et al. |
| 6,573,892 | B1 | 6/2003 | Yang et al. |
| 6,578,189 | B2 | 6/2003 | Hariya et al. |
| 6,600,487 | B1 | 7/2003 | Henn et al. |
| 6,625,938 | B1 | 9/2003 | Shimada et al. |
| 6,804,635 | B1 | 10/2004 | Dhondt et al. |
| 6,904,395 | B1 | 6/2005 | DeJack et al. |
| 6,999,908 | B2 | 2/2006 | Yang et al. |
| 7,098,912 | B1 | 8/2006 | Borden et al. |
| 7,166,381 | B2 | 1/2007 | Choi et al. |
| 7,181,377 | B1 | 2/2007 | Borden et al. |
| 7,671,858 | B1 | 3/2010 | Staten et al. |
| 7,711,532 | B2 | 5/2010 | Dulac et al. |
| 7,930,154 | B2 | 4/2011 | Brusoe |
| 8,126,234 | B1 | 2/2012 | Edwards et al. |
| 8,150,663 | B2 | 4/2012 | Mallet et al. |
| 8,194,068 | B1 | 6/2012 | Staten et al. |
| 8,200,464 | B2 | 6/2012 | Slavik |
| 2002/0120430 | A1 | 8/2002 | Yang et al. |
| 2002/0144231 | A1 | 10/2002 | Hariya et al. |
| 2003/0056733 | A1 | 3/2003 | Niki |
| 2004/0210429 | A1 | 10/2004 | Yu et al. |
| 2006/0139358 | A1 | 6/2006 | Cho et al. |
| 2006/0265169 | A1 | 11/2006 | Breister et al. |
| 2008/0021684 | A1 | 1/2008 | Dulac et al. |
| 2008/0100619 | A1 | 5/2008 | Chien et al. |
| 2008/0189068 | A1 | 8/2008 | Brusoe |
| 2008/0221839 | A1 | 9/2008 | Pasino |
| 2008/0221845 | A1 | 9/2008 | Yu et al. |
| 2008/0303817 | A1 | 12/2008 | Kataoka et al. |
| 2009/0015586 | A1 | 1/2009 | Im et al. |
| 2009/0112527 | A1 | 4/2009 | Mora et al. |
| 2009/0219287 | A1* | 9/2009 | Wang ............... G06T 15/50 345/426 |
| 2010/0256957 | A1 | 10/2010 | Slavik |
| 2010/0288204 | A1 | 11/2010 | Costello et al. |
| 2010/0290679 | A1 | 11/2010 | Gasser et al. |

FOREIGN PATENT DOCUMENTS

| | | | |
|---|---|---|---|
| EP | 0704811 | A2 | 4/1996 |
| EP | 0914909 | A2 | 5/1999 |
| EP | 0980049 | A2 | 2/2000 |
| EP | 1077431 | A1 | 2/2001 |
| EP | 1385103 | A1 | 1/2004 |
| EP | 1098208 | B1 | 9/2004 |
| EP | 1385103 | B1 | 9/2006 |
| EP | 1978487 | A2 | 10/2008 |
| EP | 1751585 | B1 | 11/2009 |
| EP | 2237175 | A1 | 10/2010 |
| EP | 2206086 | B1 | 5/2011 |
| JP | 2012198847 | | 10/2012 |
| WO | 0203173 | A2 | 1/2002 |
| WO | 02101659 | A2 | 12/2002 |
| WO | 2004072741 | A2 | 8/2004 |
| WO | 2004072741 | A3 | 8/2004 |
| WO | 2005119304 | A1 | 12/2005 |
| WO | 2006127632 | A2 | 11/2006 |
| WO | 2008094520 | A2 | 8/2008 |
| WO | 2009014398 | A2 | 1/2009 |
| WO | 2009049681 | A1 | 4/2009 |
| WO | 2009050304 | A1 | 4/2009 |
| WO | 2009053451 | A1 | 4/2009 |
| WO | 2012065619 | A1 | 5/2012 |

OTHER PUBLICATIONS

Marco Tarini et al, PolyCube-Maps, ACM Transactions on Graphics vol. 23 Issue 3, pp. 853-860, 2004.*

Shenghua Wan et al, A topology-preserving optimization algorithm for polycube mapping, Computers and Graphics vol. 35 Issue 3, pp. 639-649, Jun. 2011.*

Shuchu Han et al, Hexahedral shell mesh construction via volumetric polycube map, Computer-Aided Design, vol. 43 Issue 10, pp. 1222-1233, Oct. 2011.*

Gregson, James et al., All-Hex Mesh Generation via Volumetric PolyCube Deformation, Eurographics Symposium on Geometry Processing 2011, vol. 30 (2011), No. 5.

Labelle et al., "Isosurface Stuffing: Fast Tetrahedral Meshes with Good Dihedral Angles", Siggraph 2007, Conference Proceedings, University of California at Berkeley Conference.

Mitchell, Scott A., "Technical History of Hex Mesh Generation", Sandia National Labs, CUBIT Mesh Generation Project, Sep. 15, 2002.

Xia, Jiazhi et al., "Direct-Product Volumetric Parameterization of Handlebodies via Harmonic Fields", 2010 Shape Modeling International Conference.

Ben-Chen M. et al., "Variational Harmonic Maps for Space Deformation", ACM Transactions on Graphics, vol. 28, No. 3, Article 34, Aug. 2009.

Brewer M., Diachin L. F., Knupp P. M., Leurent T., Melander D.: The mesquite mesh quality improvement toolkit. In Proc. Intl. Meshing Roundtable (2003).

Botsch M., Pauly M., Wicke M., Gross M. H.: Adaptive space deformations based on rigid cells. Computer Graphics Forum 26, 3 (2007), 339-347.

Bommes D., Zimmer H., Kobbelt L.: Mixed integer quadrangulation. ACM Trans. Graph. 28, 3 (2009), 1-10.

Cignoni P. et al., "Metro: measuring error on simplified surfaces", Tech. rep., Paris, 1996.

Daniels J. et al., "Semi-regular Quadrilateral-only Remeshing from Simplified Base Domains", In Proc. Symp. on Geom. Proc. (2009), pp. 1427-1435.

Eppstein D. et al., "Steinitz Theorems for Orthogonal Polyhedra", In Proc. Symposium on Computational geometry (2010), SoCG '10, pp. 429-438.

Floater M.S. et al., "Mean value coordinates in 3D", Comput. Aided Geom. Des. 22 (Oct. 2005), 623-631.

He Y. et al. "A Divide-and-Conquer Approach for Automatic Polycube Map Construction", Computers and Graphics 33 (2009), 369-380.

Han S. et al., "Hexahedral Shell Mesh Construction via Volumetric Polycube Map", In Proceedings of the 14th ACM Symposium on Solid and Physical Modeling (New York, NY, USA, 2010), SPM '10, ACM, pp. 127-136.

Kälberer F. et al., "QuadCover—Surface Parameterization using Branched Coverings", Computer Graphics Forum 26, 3 (2007), 375-384.

Levy B.: Graphite. http://alice.loria.fr/. Prior to filing date Jul. 22, 2013.

Lin J. et al., "Automatic PolyCube-Maps", In Advances in Geometric Modeling and Processing, (2008), pp. 3-16.

Lavin Y. et al., "The Topology of Three-Dimensional Symmetric Tensor Fields", In Late Breaking Hot Topics IEEE Visualization '96 (1996), CS Press, pp. 43-46.

Owen Steven J., "A Survey of Unstructured Mesh Generation Technology" Available online as of Jul. 22, 2013: http://www.imr.sandia.gov/papers/imr7/owen_meshtech98.ps.gz, 25 pgs.

Levy B. et al., "Lp Centroidal Voronoi Tesselation and its Applications", ACM Trans. Graph. 29, 4, Article 119 (Jul. 2010).

Li X. et al., "Feature-aligned Harmonic Volumetric Mapping using MFS", Computers & Graphics 34 (2010), pp. 242-251.

Marechal L., "Advances in Octree-Based All-Hexahedral Mesh Generation: Handling Sharp Features", In Proc. International Meshing Roundtable, 2009.

Muller-Hannemann M., "Shelling Hexahedral Complexes for Mesh Generation", Journal of Graph Algorithms and Applications, vol. 5, No. 5, (2001), pp. 59-91.

Owen S. J., "A Survey of Unstructured Mesh Generation Technology", Department of Civil and Environment Engineering, Carngie Mellon University, (1998).

(56) References Cited

OTHER PUBLICATIONS

Zhou K. et al., "Large Mesh Deformation Using the Volumetric Graph Laplacian", .Association for Computing Machinery Inc. (2005), pp. 496-503.
Pebay P. et al., "New Applications of the Verdict Library for Standardized Mesh Verification, Pre, Post, and End-to-End Processing", Sandia National Laboratories, The University of Iowa, (2007).
Schneiders R., "A Grid-based Algorithm for the Generation of Hexahedral Element Meshes", Engineering with Computers 12 (1996), 168-177.
Shepherd J. F., "Topologic and Geometric Constraint Based Hexahedral Mesh Generation", PhD thesis, University of Utah, May 2007, Part 1 of 4, 50 pgs.
Shepherd J. F., "Topologic and Geometric Constraint Based Hexahedral Mesh Generation", PhD thesis, University of Utah, May 2007, Part 2 of 4, 50 pgs.
Shepherd J. F., "Topologic and Geometric Constraint Based Hexahedral Mesh Generation", PhD thesis, University of Utah, May 2007, Part 3 of 4, 50 pgs.
Shepherd J. F., "Topologic and Geometric Constraint Based Hexahedral Mesh Generation", PhD thesis, University of Utah, May 2007, Part 4 of 4, 45 pgs.
TetGen, "A Quality Tetrahedral Mesh Generator and Three-Dimensional Delaunay Triangulator" Available online: http://www.tetgen.org. Prior to filing date of Jul. 22, 2013.
Shepherd J. F., "Hexahedral Mesh Generation Constraits", Scientific Computing and Imaging Institute, University of Utah, Feb. 13, 2006.
Staten M. et al., "Unconstrained Paving and Plastering: Progress Update", Sandia Corporation (2006), pp. 469-486.
Sorkine O., "Differential Representations for Mesh Processing", School of Computer Science, Tel Aviv University, vol. 25 (2006), No. 4, 789-807.
Suzuki T. et al., "An Interior Surface Generation Method for All-Hexahedral Meshing", In Proc. International Meshing Roundtable (2005), pp. 377-397.
Tarini M. et al., "PolyCube-Maps", In Proc. Siggraph (2004), pp. 853-860.
Tournois J. et al., "Interleaving Delaunay Refinement and Optimization for Practical Isotropic Tetrahedron Mesh Generation", ACM Trans. Graph. 28 (2009).
Vyas V. et al., "Tensor-Guided Hex-Dominant Mesh Generation with Targeted All-Hex Regions", In Proc. International Meshing Roundtable (2009), Department of Mechanical Engineering, Carnegie Mellon University.
Wicke M. et al., Dynamic Local Remeshing for Elastoplastic Simulation, ACM Trans. Graph. 29 (Jul. 2010), University of California, Berkeley.
Yu Y. et al., "Mesh Editing with Poisson-Based Gradient Field Manipulation", ACM Siggraph (2004), pp. 1-8.
Yao et al., "Adaptive geometry image", 2008, IEEE Transactions on Visualization and Computer Graphics 14, 4, 948-960.
Wang, H. et al., "Polycube splines", 2007, In Proc. Symposium Solid and physical modeling, 241-251.
Chang, C., et al., "Texture tiling on 3d models using automatic polycube maps and wang tiles", 2010, J. Inf. Sci. Eng. 26, 1, 291-305.
Alice Project-Team. Graphite. http://alice.loria. fr/software/graphite/ (downloaded Jun. 30, 2016).
Bommes, D., L'evy, B., Pietroni, N., Puppo, E., Silva, C., Tarini, M., and Zorin, D. 2013. Quad-mesh generation and processing: A survey. Computer Graphics Forum.
Boykov, Y., and Kolmogorov, V. 2001. An experimental comparison of min-cut/max-flow algorithms for energy minimization in vision. IEEE Transactions on Pattern Analysis and Machine Intelligence 26, 359-374.
Wan, S., Yin, Z., Zhang, K., Zhang, H., and Li, X. 2011. A topology-preserving optimization algorithm for polycube mapping. Computers & Graphics 35, 3, 639-649.
Xu, Y., Chen, R., Gotsman, C., and Liu, L. 2011. Embedding a triangular graph within a given boundary. Computer Aided Geometric Design 28, 6, 349-356.
Gu, X., Gortler, S. J., and Hoppe, H. 2002. Geometry images. ACM Trans. Graph. 21, 3 (Jul.), 355-361.
Xia, J., Garcia, I., He, Y., Xin, S.-Q., and Patow, G. 2011. Editable polycube map for gpu-based subdivision surfaces. In Proc. Symposium on Interactive 3D Graphics and Games, 151-158.
Wang, H., Jin, M., He, Y., Gu, X., and Qin, H. 2008. User-controllable polycube map for manifold spline construction. In Proc. Symposium on Solid and physical modeling, 397-404.
Hoos, H., and Sttzle, T. 2004. Stochastic Local Search: Foundations & Applications. Morgan Kaufmann Publishers Inc., San Francisco, CA, USA.
Hormann, K., and Floater, M. S. 2006. Mean value coordinates for arbitrary planar polygons. ACM Transactions on Graphics 25, 4 (Oct.), 1424-1441.
Ju, T., Schaefer, S., and Warren, J. 2005. Mean value coordinates for closed triangular meshes. SIGGRAPH, 561-566.
Kolmogorov, V., and Zabih, R. 2004. What energy functions can be minimized via graph cuts. IEEE Transactions on Pattern Analysis and Machine Intelligence 26, 65-81.
L'evy, B., and Liu, Y. 2010. Lp centroidal voronoi tesselation and its applications. ACM Transactions on Graphics (Proc. SIGGRAPH).
Li, B. and Qin, H. 2012. Component-aware tensor-product trivariate splines of arbitrary topology. Computers & Graphics.
Li, B. Li, X. Wang, K., and Qin, H. 2010. Generalized poly-cube trivariate splines. In Proc. Shape Modeling International, 261-265.
Praun, E., and Hoppe, H. 2001 Spherical parametrization and remeshing. ACM Trans. Graph. 22, 3 (Jul.), 340-349.
Shamir, A. 2008. A survey on mesh segmentation techniques. Comput. Graph. Forum 27, 1539-1556.
Sheffer, A., Praun, E., and Rose, K. 2006. Mesh parameterization methods and their applications. Foundations and Trends in Computer Graphics and Vision 2, 2, 105-171.
Shepherd, J. F., and Johnson, C. R. 2008. Hexahedral mesh generation constraints. Engineering with Computers 24, 3, 195-213.
Tautges, T. J., Blacker, T., and Mitchell, S. A. 1996. The whisker weaving algorithm: a connectivity-based method for constructing all-hexahedral finite element meshes. Intl. Journal for Numerical Methods in Engineering 39, 19, 3327-3349.
Miyoshi, K., and Blacker, T. 2000. Hexahedral mesh generation using multi-axis cooper algorithm. In Proc. International Meshing Roundtable, 89-97.
Li, Y., Liu, Y., Xu, W., Wang, W., and Guo, B. 2012. All-hex meshing using singularity-restricted field. ACM Trans. Graph. 31, 6.
Livesu, M., Vining, N., Sheffer, A., Gregson, J., and Scateni, R. 2013. Polycut: monotone graph-cuts for polycube base-complex construction. ACM Trans. Graph. 32, 6.
Huang, J., Jiang, T., Shi, Z., Tong, Y., Bao, H., and Desbrun, M. 2014. L1 based construction of polycube maps from complex shapes. ACM Trans. Graph. 33, 3 (Jun.), 25:1-25:11.
Aigerman, N., and Lipman, Y. 2013. Injective and bounded distortion mappings in 3d. ACM Trans. Graph. 32, 4.
Blacker, T. 2000. Meeting the challenge for automated conformal hexahedral meshing. In Proc. International Meshing Roundtable.
Erickson, J. 2014. Efficiently hex-meshing things with topology. Discrete and Computational Geometry 52, 3, 427-449.
Freitag Diachin, L., Knupp, P., Munson, T., and Shontz, S. 2006. A comparison of two optimization methods for mesh quality improvement. Engineering with Computers 22, 2, 61-74.
Knupp, P. M. 2001. Hexahedral and tetrahedral mesh untangling. Engineering with Computers 17, 3, 261-268.
Knupp, P. M. 2003. A method for hexahedral mesh shape opti¬mization. Intl. Journal for Numerical Methods in Engineering 58, 2, 319-332.
Nieser M Reitebuch, U., and Polthier, K. 2011. Cube-Cover—Parameterization of 3D Volumes. Computer Graphics Forum.
Paillé, G.-P., Poulin, P., and L'evy, B. 2013. Fitting polynomial volumes to surface meshes with Voronöi squared distance minimization. Computer Graphics Forum 32, 5, 103-112.

(56) References Cited

OTHER PUBLICATIONS

Ruiz-Gironés, E., Roca, X., Sarrate, J., Montenegro, R., and Escobar, J. 2014. Simultaneous untangling and smoothing of quadrilateral and hexahedral meshes using an object-oriented framework. Advances in Engineering Software.

Zhang, Y., Bajaj, C., and Xu, G. 2009. Surface smoothing and quality improvement of quadrilateral/hexahedral meshes with geometric flow. Communications in Numerical Methods in Engineering 25, 1, 1-18.

Sastry, S. P., and Shontz, S. M. 2009. A comparison of gradient-and hessian-based optimization methods for tetrahe¬dral mesh quality improvement. In Proc. International Meshing Roundtable.

Schüller, C., Kavan, L., Panozzo, D., and Sorkine-Hornung, O. 2013. Locally injective mappings. Computer Graphics Forum (Proc. SGP) 32, 5, 125-135.

Sorkine, O., and Alexa, M. 2007. As-rigid-as-possible surface modeling. In Proc. SGP, 109-116.

Sun, L., Zhao, G., and Ma, X. 2012. Quality improvement methods for hexahedral element meshes adaptively generated using grid-based algorithm. Intl. Journal for Numerical Methods in Engineering 89, 6, 726-761.

Vartziotis, D., and Himpel, B. 2014. Efficient and global optimization-based smoothing methods for mixed-volume meshes. In Proc. International Meshing Roundtable. 293-311.

Vartziotis, D., and Papadrakakis, M. 2011 Improved GETMe by adaptive mesh smoothing. Computer Assisted Meth¬ods in Engineering and Science, 20, 55-71.

Wilson, T., Sarrate, J., Roca, X., Montenegro, R., and Escobar, J. 2012. Untangling and smoothing of quadrilateral and hexahedral meshes. In Eighth Intl. Conference on Engineering Computational Technology.

Sastry, S., and Shontz, S. 2014. A parallel log-barrier method for mesh quality improvement and untangling. Engineering with Computers 30, 4, 503-515.

\* cited by examiner

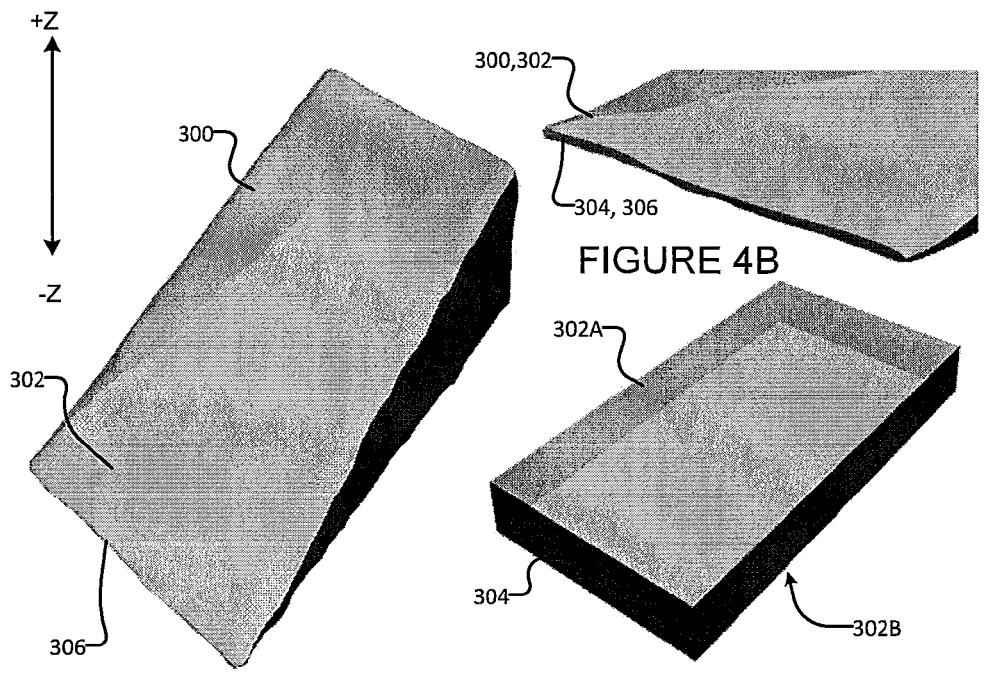
FIGURE 4B
FIGURE 4C
FIGURE 4A
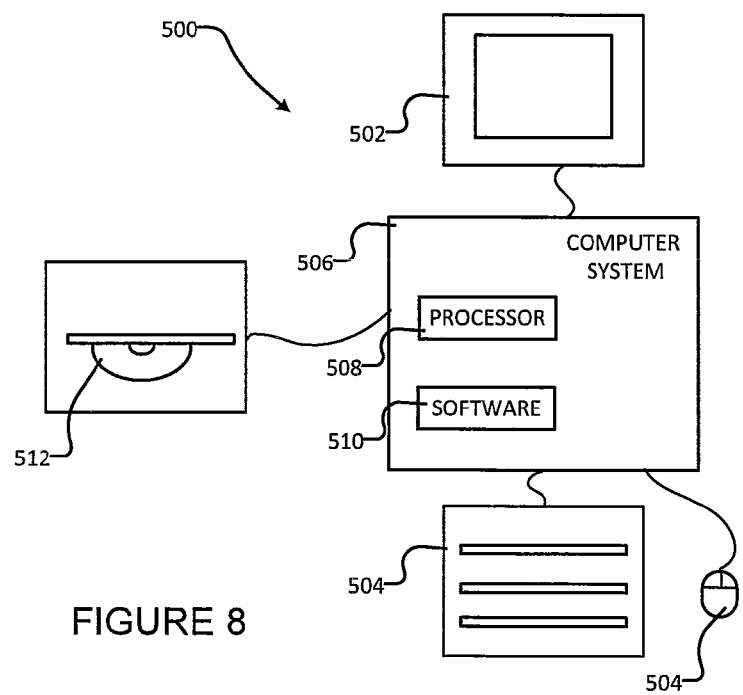
FIGURE 8

METHODS AND SYSTEMS FOR GENERATING POLYCUBES AND ALL-HEXAHEDRAL MESHES OF AN OBJECT

RELATED APPLICATIONS

This application claims priority from U.S. application No. 61/673,884 filed 20 Jul. 2012 which is hereby incorporated herein by reference.

TECHNICAL FIELD

This invention relates generally to digital (e.g. computer) representations of objects. Particular embodiments provide methods and systems for generating polycube representations of input objects. Particular embodiments provide methods and systems for using polycube representations to generate hexahedral-meshes of input objects.

BACKGROUND

Three-dimensional models of input objects may be digitally modeled (e.g. on a computer system and/or other suitable processor(s)) in volumetric representations known as tetrahedral-meshes or "tet-meshes". There are techniques known in the art for obtaining tet-mesh representations of objects. For example, isotropic volumetric tet-meshes can be generated from isotropic surface meshes using known software, such as Tetgen™. Non-isotropic surface meshes can be re-meshed using known software such as Graphite™ and the re-meshed surface meshes may then be used to generate suitable volumetric tet-meshes.

Due to their numerical properties, volumetric hexahedral-meshes ("hex-meshes") of objects may be preferred volumetric representations (over tet-meshes) for a variety of applications. Non-limiting examples of applications where hex-meshes are preferred over tet-meshes include numerical simulations used in engineering applications. However, automatically generating volumetric hex-meshes from the tet-meshes of arbitrary input objects where the hex-meshes exhibit suitably high quality (e.g. element shape quality and connectivity) remains an open problem. Consequently, industrial practitioners still largely rely on a variety of semi-manual hex-meshing approaches which require considerable user interaction, and can involve days or even weeks to generate hex-meshes of complex shapes.

One known approach for all-hexahedral (or "all-hex") meshing, referred to as mapping or sub-mapping, is based on a volumetric mapping between the input model of an object (typically, but not necessarily, modeled as a tetrahedral-mesh typically referred to as a "tet-mesh") and a so-called "polycube" representation of the input object. A polycube is a solid formed by joining several cubes face-to-face. A polycube has a trivial hex mesh. Sub-mapping methods relate the trivial hex-mesh of the polycube to the input object model using the volumetric mapping to provide an output hex-mesh corresponding to the input object. Typically, these methods require that the polycube representation of the input object and the mapping between the input object model and the polycube representation be generated manually by the user or with significant user input. For these sub-mapping techniques, the quality of the output hex-mesh depends significantly on distortion associated with the mapping between the input object model and the polycube. There is accordingly a general desire to provide methods for automatically generating low-distortion mappings between input objects (e.g. having general shapes) and corresponding polycube representations.

There is a general desire to generate hex-meshes having reasonable quality in terms of quality metrics referred to as element shape quality and connectivity. Element shape quality is often defined as the deviation of hex-mesh elements from a perfect cube. When a hex-mesh is used for particular applications (e.g. engineering simulations and/or the like), the element shape quality of the hex-mesh can impact the accuracy and/or robustness of simulations. Simulation results depend not only on average element shape quality, but also on minimum element shape quality with even a single "inverted" (negative Jacobian) element rendering a hex-mesh unusable for simulation. Connectivity of a hex-mesh representation also impacts the ability to use the hex-mesh for particular applications. For example, when a hex-mesh is used for engineering simulations, connectivity of the hex-mesh can impact hex-mesh processing time, the ability to use distributed processing (parallelization) to implement the simulation and/or the like.

Known hex-meshing techniques used in industry tend to fall into two categories: hex-dominant and grid-based. Hex-dominant methods tend to create meshes which include a significant percentage of non-hex elements (e.g. often more than 20%). When using the resulting mesh for subsequent applications (e.g. engineering simulations and/or the like), non-hex elements require specialized numerics and may not suit some applications. Grid-based methods (also known as octree methods) intersect the input model with a Cartesian grid defining the mesh interior. This grid is then connected to the surface using a variety of techniques. Grid-based methods often need excessively fine local element sizes on off-axis or concave features and tend to form low shape quality elements with irregular connectivity in regions corresponding to such features.

There is a general desire to provide techniques to generate hex-mesh volumetric representations of objects which overcome or ameliorate some of the issues with prior art techniques.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for generating a polycube representation of an input object, the method comprising: receiving, at a processor, an input volumetric representation of the input object; deforming, by the processor, the input volumetric representation to provide a deformed object representation; and extracting, by the processor, a polycube representation of the object from the deformed object representation, the polycube representation comprising a solid figure made of cubes joined face to face, the solid figure comprising axis-aligned surface planes which having normal vectors that align with one of six directions ($\pm X, \pm Y, \pm Z$) aligned with a set of global Cartesian axes. Deforming, by the processor, the input volumetric representation to provide the deformed object representation comprises effecting, by the processor, a tradeoff between competing objectives of: deforming the input volumetric representation in a manner which provides surfaces having normal vectors closely aligned with one of the six directions aligned with the set of global Cartesian axes; and deforming the input volumetric representation in a manner which provides low-distortion deformations.

In some embodiments, effecting, by the processor, the tradeoff between the competing objectives comprises effecting, by the processor, a computationally optimized balance between the competing objectives of: deforming the input volumetric representation in a manner which provides surfaces having normal vectors closely aligned with one of the six directions aligned with the set of global Cartesian axes; and deforming the input volumetric representation in a manner which provides low-distortion deformations. In some embodiments, deforming, by the processor, the input volumetric representation to provide the deformed object representation comprises starting with the input volumetric representation as a current model and then iteratively deforming the current model, wherein each iteration comprises effecting, by the processor, a tradeoff between competing objectives of: deforming the current model in a manner which provides surfaces having normal vectors closely aligned with one of the six directions aligned with the set of global Cartesian axes; and deforming the current model in a manner which provides low-distortion deformations to the current model in each iteration.

In some embodiments, iteratively deforming the current model comprises, in each iteration: for each surface vertex of the current model, determining, by the processor, a surface vertex anchor rotation that would align a normal vector associated with the surface vertex with a corresponding one of the six directions aligned with the set of global Cartesian axes; performing, by the processor, a computational optimization which determines interior rotations for each of the interior vertices of the current model and which is permitted to modify the surface vertex anchor rotations to provide updated surface rotations for each of the surface vertices of the current model; applying, by the processor, the interior rotations to the interior vertices and the updated surface rotations to the surface vertices to determine an iteration output model with new positions for the vertices; and setting the iteration output model to be the current model for the next iteration.

In some embodiments, the input volumetric representation comprises a polyhedral-mesh representation of the input object, the polyhedral-mesh representation comprising a plurality of notional polyhedrons, each notional polyhedron comprising a corresponding plurality of vertices, a plurality of linear edges that extend between corresponding pairs of vertices and a plurality of polygonal faces defined by corresponding pluralities of edges.

In some embodiments, extracting, by the processor, the polycube representation from the deformed object representation comprises: labeling, by the processor, each surface face of the deformed object representation with a corresponding one of the six directions aligned with the set of global Cartesian axes; segmenting, by the processor, the surface faces of the deformed object into charts, each chart comprising a contiguous patch of surface faces having the same label; and warping, by the processor, the deformed object representation to output a polycube representation that complies with polycube constraints, wherein warping the deformed object representation comprises adjusting the positions of the vertices of the deformed object representation to obtain updated vertex positions for the polycube representation, such that, for each chart, the updated vertex positions of the surface vertices associated with the chart are constrained to a corresponding plane, the corresponding plane having a normal vector aligned with the one of the six directions aligned with the set of global Cartesian axes corresponding to the chart label.

In some embodiments, warping, by the processor, the deformed object representation to output the polycube representation that complies with polycube constraints comprises performing, by the processor, a computational constrained optimization which determines the updated vertex positions for the polycube representation wherein, for each chart, a constraint is that the updated vertex positions of the surface vertices associated with the chart are constrained to the corresponding plane. In some embodiments, performing, by the processor, the computational constrained optimization comprises minimizing a warping objective function, the warping objective function comprising a first cost function that assigns cost that is positively correlated with changes between the positions of the vertices of the deformed object representation and the updated vertex positions of the polycube representation. In some embodiments, the warping objective function comprises a second cost function that assigns cost to changing a distance between one or more pairs of charts labeled with either the positive or negative direction of the same global Cartesian axis.

The methods for generating a polycube representation of an input object may subsequently be used to generate a hex-mesh representation of the input object.

According to another aspect of the invention, there is provided a computer-implemented method for generating a hexahedral mesh of an input object, comprising: receiving a computer-readable volumetric representation of the input object having a plurality of surface and interior points; computationally deforming the volumetric representation into a deformed object; computationally extracting a polycube from the deformed object; and generating a computer-readable hexahedral mesh of the input object. The following steps are performed to computationally deform the volumetric representation into a deformed object: (i) for each surface point of the volumetric representation, determine a preferred rotation value that aligns a surface normal at the surface point with a selected Cartesian axis; (ii) determine a rotation field comprising a rotation value for each point of the volumetric representation as a function of providing a selected trade-off between minimal variability of rotation values of selected nearby points (e.g. low-distortion deformations) and satisfying the preferred rotation values determined for the plurality of surface points; and (iii) apply rotation values coherently throughout the volumetric representation by applying Poisson integration of the determined rotation fields thereby computing new positions of the points and creating the deformed object. The following steps are performed to computationally extract a polycube from the deformed object: (i) associate each surface face of the deformed object with a Cartesian axis to form contiguous surface patches which correspond to surface faces of the polycube, then (ii) warp the deformed object using positional constraints to align each contiguous surface patch with the associated Cartesian axis and to enforce planarity. The computer-readable hexahedral mesh of the input object is generated by generating a hexahedral grid of the polycube then warping the grid to the input object by using an explicit correspondence between the polycube and the volumetric representation.

According to another aspect of the invention, the methods described herein are encoded on computer readable media and which contain instructions executable by a processor to cause the processor to perform one or more of the methods described herein.

According to another aspect of the invention, systems are provided for generating a polycube representation of an input object. The systems comprise processors which are configured to perform the methods for generating a polycube representation of an input object as described herein. Another aspect of the invention provides system for generating a hexahedral mesh of an input object. The systems comprise processors which are configured to perform the methods for generating a hexahedral mesh of an input object as described herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A-4C (collectively, FIG. 4) show an example of how a segmentation may be modified by splitting to deal with multi-orientation charts.

FIG. 8 is a schematic representation of a system according to a particular embodiment which may be used to implement a number of the methods described herein.

DESCRIPTION

Figure 1:
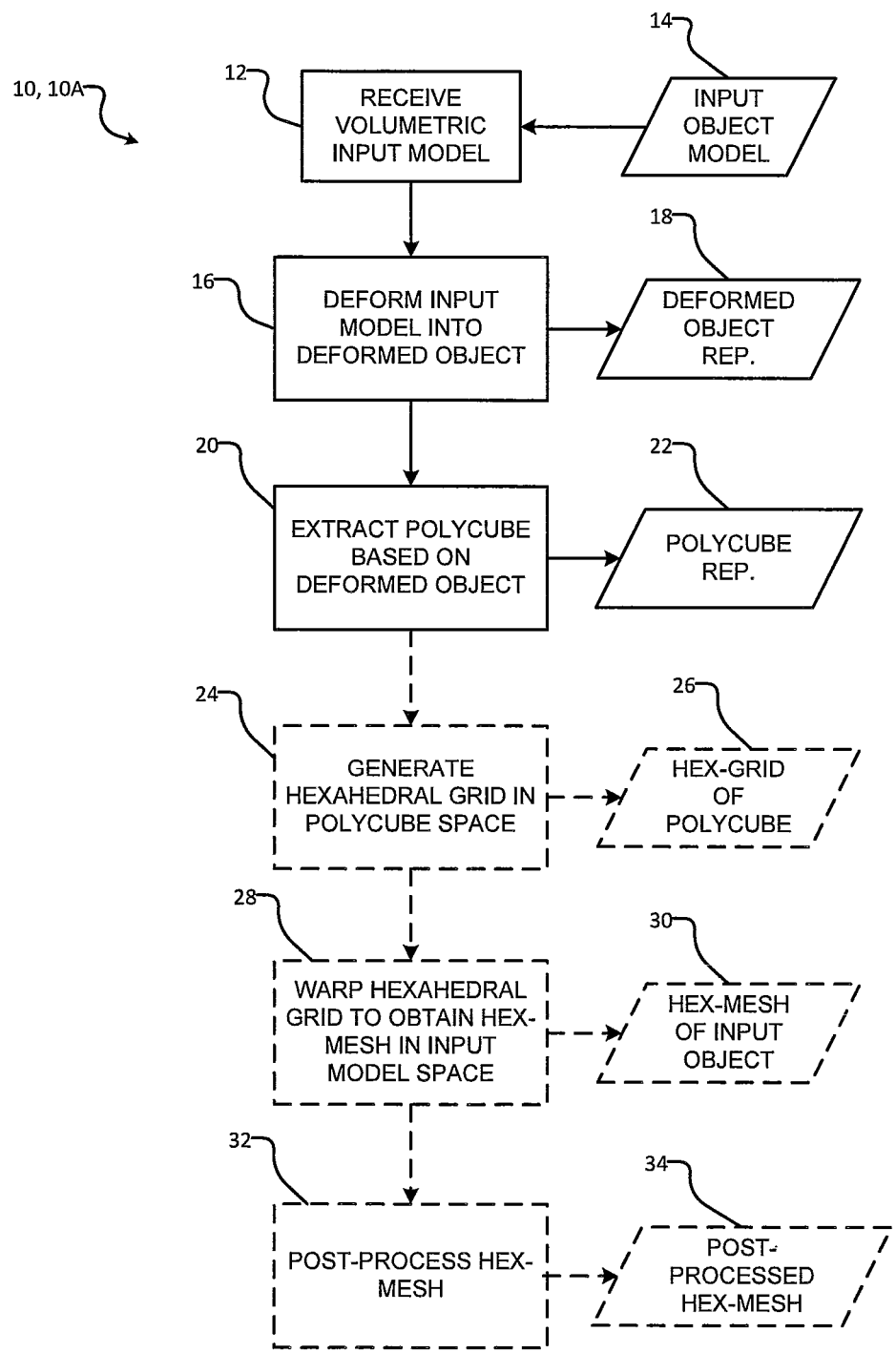
FIG. 1 is a schematic representation of a method for generating a polycube representation of an input object according to a particular embodiment of the invention and an optional method for using the polycube representation to generate a hex-mesh representation of the input object.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide methods, systems and computer-readable media for generating polycube representations of input objects. In particular embodiments, such methods comprise: receiving, at a processor, an input volumetric representation of an input object; deforming, by the processor, the input volumetric representation to provide a deformed object representation; and extracting, by the processor, a polycube representation from the deformed object representation. Deforming the input volumetric representation to provide the deformed object representation may comprise effecting, by the processor, a tradeoff (e.g. a computationally optimized balance) between competing objectives of: deforming the input volumetric representation in a manner which provides surfaces having normal vectors closely aligned with one of six directions ($\pm X, \pm Y, \pm Z$) aligned with a set of global Cartesian axes; and deforming the input volumetric representation in a manner which provides low-distortion deformations to the input volumetric representation. Such low-distortion deformations may comprise deformations that tend to minimize changes to the underlying volumetric representation and/or spatially smooth deformations that are not discontinuous and/or do not otherwise exhibit overly high spatial rates of deformation change. Deforming the input volumetric representation to provide the deformed object representation may comprise starting with the input volumetric representation as a current model and then iteratively deforming the current model, wherein each iteration comprises effecting, by the processor, a tradeoff (e.g. computationally optimized balance) between competing objectives of: deforming the current model in a manner which provides surfaces having normal vectors closely aligned with one of the six directions ($\pm X, \pm Y, \pm Z$) aligned with the set of global Cartesian axes; and deforming the current model in a manner which provides low-distortion deformations to the input volumetric representation. Such low-distortion deformations may comprise: deformations that tend to minimize changes to the underlying volumetric representation (e.g. as compared to the input volumetric representation and/or as compared to the current model) and/or spatially smooth deformations (e.g. deformations that are not discontinuous and/or do not otherwise exhibit overly high spatial rates of deformation change). Systems according to particular embodiments may comprise a processor configured to perform such polycube generation methods. Non-transitory computer-readable media may be provided with instructions, which (when executed by a suitably configured processor, cause the processor to perform such polycube generation methods.

Aspects of the invention provide methods, systems and computer-readable media for generating a hex-mesh representation of an input object using a polycube representations generated from the input object. In particular embodiments, such methods comprise: generating, by the processor, parameterizations of points on a hexahedral grid corresponding to the polycube representation in a polycube domain; and applying the parameterizations to the input volumetric representation in an input model domain to form the hex-mesh representation.

Aspects of the invention provide computer-implemented methods, systems and computer readable media for generating digital polycube representations (e.g. on a computer system and/or other suitable processor(s)) of input objects.

Polycubes in their most general form comprise solid figures formed by joining equal cubes face to face. In practice, where polycube representations are used by suitably configured computers, polycubes are typically defined in a Cartesian coordinate system and are defined to be volumes bounded by axis-aligned planes—i.e. planes that align with the orthogonal X, Y and Z-axes of the coordinate system.

Throughout the disclosure where a processor, computer or computer readable medium is referenced such a reference may include one or more processors, computers or computer readable media in communication with each other through one or more networks or communication mediums. The one or more processors and/or computers may comprise any suitable processing device known in the art, such as, for example, application specific circuits, programmable logic controllers, field programmable gate arrays, microcontrollers, microprocessors, computers, virtual machines and/or electronic circuits. The one or more computer readable media may comprise any suitable memory devices known in the art, such as, for example, random access memory, flash memory, read only memory, hard disc drives, optical drives and optical drive media, or flash drives. Further, where a communication to a device or a direction of a device is referenced it may be communicated over any suitable electronic communication medium and in any suitable format known to in the art, such as, for example, wired or wireless mediums, compressed or uncompressed formats, encrypted or unencrypted formats.

FIG. 1 is a schematic representation of a computer-implemented method 10 for generating a polycube representation of a three-dimensional input object according to a particular embodiment of the invention. As explained in more detail below, FIG. 1 also illustrates an optional method 10A which uses the polycube output from method 10 to generate a hex-mesh representation of the input object. Methods 10, 10A may be performed by a suitably configured computer and/or processor.

Figure 1A:
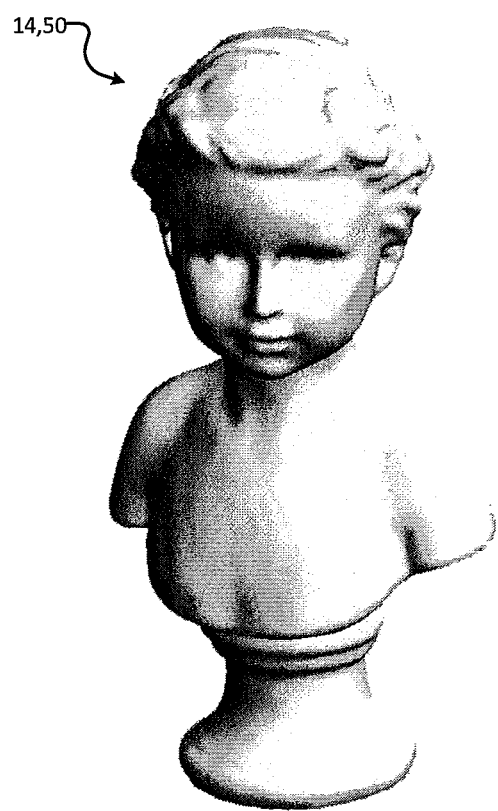
FIG. 1A shows a non-limiting example an input object which is used throughout this disclosure for the purposes of explanation.

Method 10 commences in block 12 which involves receiving a volumetric input model 14 of an input object. Volumetric input model 14 may comprise a digital representation (e.g. implemented on a computer system and/or other suitable processor(s)) which models the characteristics of the three-dimensional input object and may comprise a plurality of surface points (i.e. points intended to be on a surface of the input object) and a plurality of interior points (i.e. points intended to be in an interior of the input object). The input object corresponding to input model 14 itself can generally be arbitrary. FIG. 1A shows a non-limiting example input object 50 which is used throughout this disclosure for the purposes of explanation. Input model 14 may model input object 50. It will be appreciated, however, that input model 14 may generally model any three-dimensional object.

In particular embodiments, input model 14 may comprise an isotropic volumetric tetrahedral-mesh (tet-mesh) representation of input object 50. In such a tet-mesh representation, input model 14 comprises a plurality of notional tetrahedrons which model input object 50. A typical input model 14 may comprise on the order of $10^5$ or $2 \times 10^5$ notional tetrahedrons. The surface points and interior points of input model 14 may comprise the vertices of the notional tetrahedrons. Each notional tetrahedron may also comprise a plurality of linear edges that extend between corresponding pairs of vertices and a plurality of triangular faces defined by corresponding triplets of edges. As discussed above, isotropic volumetric tet-meshes can be generated from surface meshes or otherwise generated using known techniques.

In some embodiments, input model 14 may comprise other forms of volumetric polyhedral-mesh representations of input object 50. Such polyhedral mesh representations may comprise notional polyhedrons with each notional polyhedron comprising a corresponding plurality of vertices, a plurality of linear edges that extend between corresponding pairs of vertices and a plurality of faces defined by corresponding pluralities of edges. To ease the burden of explanation, it is assumed throughout the remainder of this disclosure (without the loss of generalization and unless the context dictates otherwise) that the surface points and interior points of input model 14 comprise the vertices of a tet-mesh representation and that the tet-mesh input model 14 also comprises corresponding edges and faces.

Method 10 then proceeds to block 16 which involves deforming input model 14 into a deformed object representation 18 (or, for brevity, deformed object 18). Deformed object 18 may have a polycube-like shape, but in general is not required to be a polycube in a strict sense. The block 16 deformation and resultant deformed object 18 may comprise effecting or otherwise balancing a tradeoff (e.g. a computationally optimized balance) between the competing objectives of: deforming input model 14 to provide surfaces having normal vectors closely aligned with one of six directions (±X,±Y,±Z) aligned with a set of global Cartesian axes which will be used to define polycube 22; and deforming input model 14 to provide relatively low-distortion deformations to input model 14. Such low-distortion deformations may comprise deformations that tend to minimize changes (e.g. as compared to input model 14 and its underlying volumetric representation) and/or spatially smooth deformations (e.g. deformations that are not discontinuous and/or do not otherwise exhibit overly high spatial rates of deformation change). In some embodiments, the block 16 deformation is performed iteratively, with each iteration balancing this tradeoff. Deformed object 18 may be output by method 10. This is not necessary; in some embodiments, deformed object 18 may comprise an internal representation to method 10.

As explained in more detail below, the block 16 deformation of input model 14 may comprise determination of, and application of, suitable rotation-driven deformation to input model 14. In some embodiments, the block 16 deformation may comprise an iterative process which involves starting with input model 14 as a current model and then repeatedly: determining a suitable three-dimensional rotation value (also referred to as a deformation gradient or, for brevity, a rotation) for each surface vertex in the current model; smoothly propagating the rotations for the surface vertices to interior vertices to determine a suitable rotation field comprising a suitable rotation for each (surface and interior) vertex of the current model, where the suitable rotation for each vertex involves effecting the aforementioned tradeoff (e.g. a computationally optimized balance) between alignment of surface normal vectors and providing low-distortion deformations to the underlying volumetric representation (e.g. deformations that tend to minimize changes to the underlying volumetric representation and/or to the current model and/or spatially smooth deformations that are not discontinuous and/or do not otherwise exhibit overly high spatial rates of deformation change); application of the rotations to each vertex of the current model to obtain an iteration output model; and using the iteration output model as the current model for the next iteration. This iterative process may be repeated until suitable loop-exit criteria are satisfied. The output of the block 16 rotation-driven deformation comprises a deformed object 18 which has a shape that is more polycube-like (than input object 14), but (because of the aforementioned tradeoff) is not required to be a polycube in a strict sense. Deformed object 18 also has the same general format as input model 14 (e.g. if input model 14 is a tet-mesh, then deformed object 18 output from block 16 will also comprise a tet-mesh). Particular exemplary embodiments for implementing block 16 are described in more detail below.

Method 10 then proceeds to block 20 which involves using deformed object 18 to generate a polycube representation 22 (or for brevity a polycube 22) corresponding to input object 14. Block 20 may comprise grouping surface faces of deformed object 18 (e.g. surface triangles in the case of a tet-mesh) into contiguous surface patches, where each face in a group corresponding to a contiguous surface patch is relatively more closely aligned with a corresponding one of the six global Cartesian axes (±X,±Y,±Z). Such contiguous surface patches may be referred to herein as charts. A surface face of deformed object 18 may be said to be relatively more closely aligned with a particular Cartesian axis when the surface normal of the surface face is relatively more closely aligned with the particular Cartesian axis than any other one of the Cartesian axes (e.g. the dot product of the surface normal and the particular Cartesian axis is greater than the dot product of the surface normal with any other Cartesian axis). After determining initial charts using deformed object 18, block 20 may then comprise further warping (i.e. modifying the positions of) the vertices of deformed object 18 so that the surface faces corresponding to each chart are constrained to be rigidly aligned with a particular Cartesian axis and such that the vertices of the faces of each chart are located on the same plane. A surface face may be said to be rigidly aligned with a particular Cartesian axis when the dot product of its surface normal and the particular Cartesian axis is exactly unity or within some threshold value $\epsilon$ close to unity. The output of this block 20 warping is a polycube representation 22 of the input object whose surface faces are rigidly aligned with the six Cartesian axes (±X,±Y,±Z). Particular exemplary embodiments for implementing block 20 are described in more detail below.

Polycube 22 is the output of method 10. Polycube 22 may be used for a variety of applications. By way of non-limiting example, polycube 22 may be used to generate a hex-mesh 30 of the three-dimensional input object corresponding to input model 14 (as described in more detail below with reference to optional method 10A). Other non-limiting examples of applications for polycube 22 include: storage of texture mapping for the surfaces of input model, storage of volume data relating to the input object, volumetric texturing, spline fitting, volumetric data compression, volume rendering for the input object, function interpolation, multi-resolution meshing, texture mapping, quadrilateral surface meshing, other geometry processing tasks corresponding to the input object and/or the like.

FIG. 1 also shows an optional method 10A which uses polycube 22 generated by method 10 as a basis for generating a hex-mesh representation 30 (or for brevity hex-mesh 30) of the three-dimensional input object corresponding to input model 14. Optional method 10A proceeds from block 20 of method 10 to block 24 which involves generating a hexahedral grid 26 corresponding to polycube 22 in the polycube space (polycube domain). The block 24 generation of hexahedral grid 26 in the polycube space may involve designating points in the polycube space having integer coordinates to represent the vertices of the hexahedrons of hexahedral grid 26.

Optional method 10A then proceeds to block 28 which involves generating hex-mesh 30 of the three-dimensional input object corresponding to input model 14 by warping hexahedral grid 26 to create a corresponding hex-mesh representation 30 in the space of input model 14 (input model domain). The block 28 generation of hex-mesh 30 may comprise, looping through the tetrahedrons of polycube 22 and for each such tetrahedron: parameterizing any polycube domain hex grid vertices in hexahedral grid 26 that are enclosed by the current polycube domain tetrahedron in terms of the vertices of the current polycube domain tetrahedron (e.g. in terms of barycentric coordinates (also referred to as barycentric parameters) and/or other suitable parameterizations of the vertices of the current polycube domain tetrahedron); applying the same parameters (e.g. barycentric parameters) to the vertices of the corresponding tetrahedron of input model 14 in the input model domain to thereby obtain a corresponding hex vertex in the input model domain; and optionally performing one or more validity checks on the input model domain hex vertex. The hex vertices in the input model domain corresponding to the polycube domain hex grid vertices may be output as hex-mesh 30.

determining which tetrahedrons of polycube 22 enclose the hexahedron vertices of hexahedral grid 26; parameterizing the hexahedron vertices of hexagonal grid 26 (e.g. in terms of barycentric coordinates (also referred to as barycentric parameters) and/or other suitable parameterizations) of the vertices of the corresponding tetrahedrons in the polycube domain; and applying the parameters (e.g. barycentric parameters) to the vertices of the corresponding tetrahedron of input model 14 in the input model domain to thereby obtain a corresponding hexahedron vertex in the input model domain.

Method 10A may also optionally comprise a number of post-processing procedures which may be applied to hex-mesh 30 in block 32 to obtain post-processed hex-mesh 34.

Figure 1B:
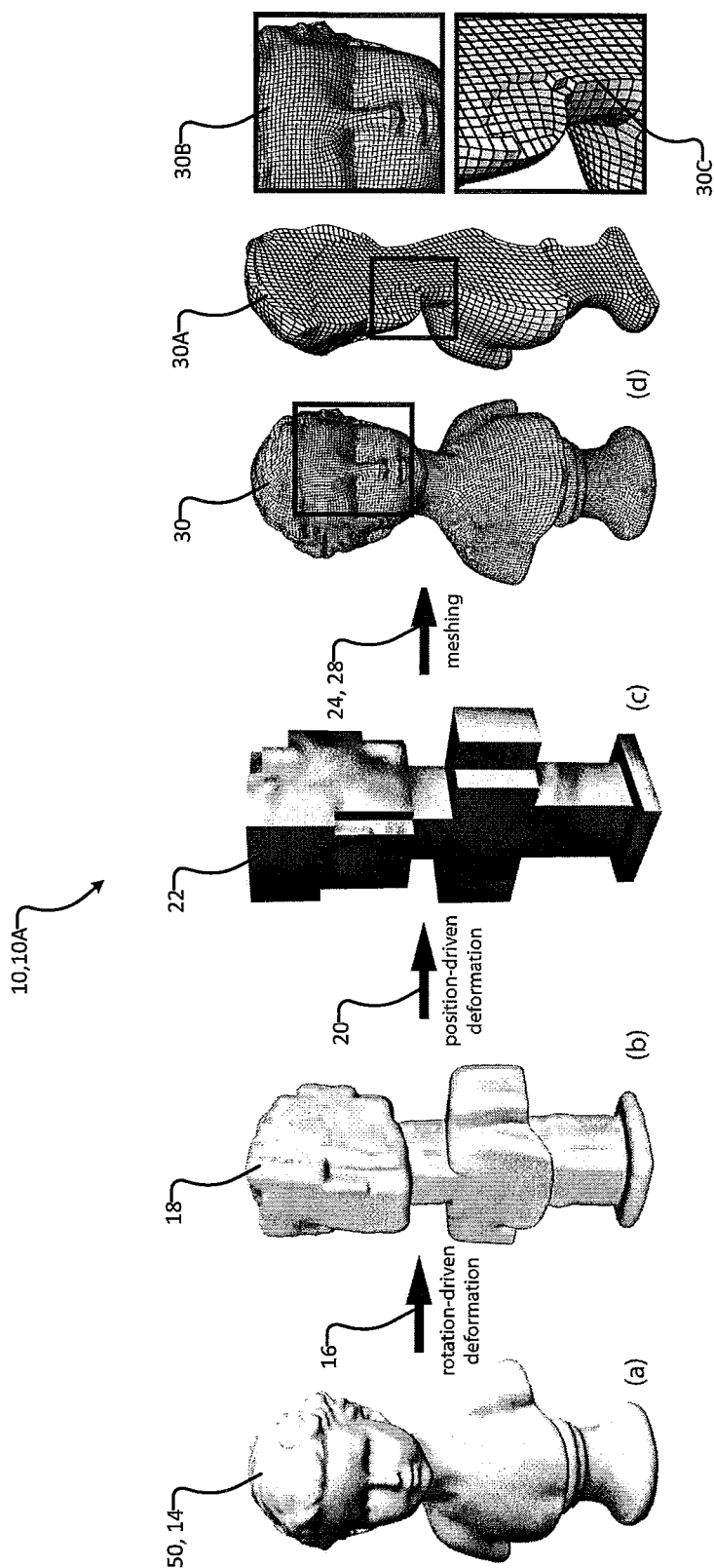
FIG. 1B depicts a number of the procedures of the FIG. 1 method applied to the FIG. 1A object and the various outputs of same.

FIG. 1B depicts a number of the method 10, 10A procedures applied to the FIG. 1A object 50 and the various outputs of same. Methods 10, 10A begin with input model 14 of object 50 and, in block 16 apply rotation-driven deformation to input model 14 to obtain a deformed object 18 which has a more polycube-like shape but which is not strictly a polycube. Methods 10, 10A then proceed to block 20 which applies position-driven deformation (with rigid constraints) to deformed object 18 to obtain polycube 22. Polycube 22 may then optionally be converted into a hex-mesh 30 using the optional procedures of blocks 24 and 28 of method 10A. FIG. 1B also shows detail of hex-mesh 30 including interior detail 30A, detail in face region 30B and detail in neck region 30C.

Individual blocks of methods 10, 10A (according to particular embodiments) are now described in more detail.

Figure 2:
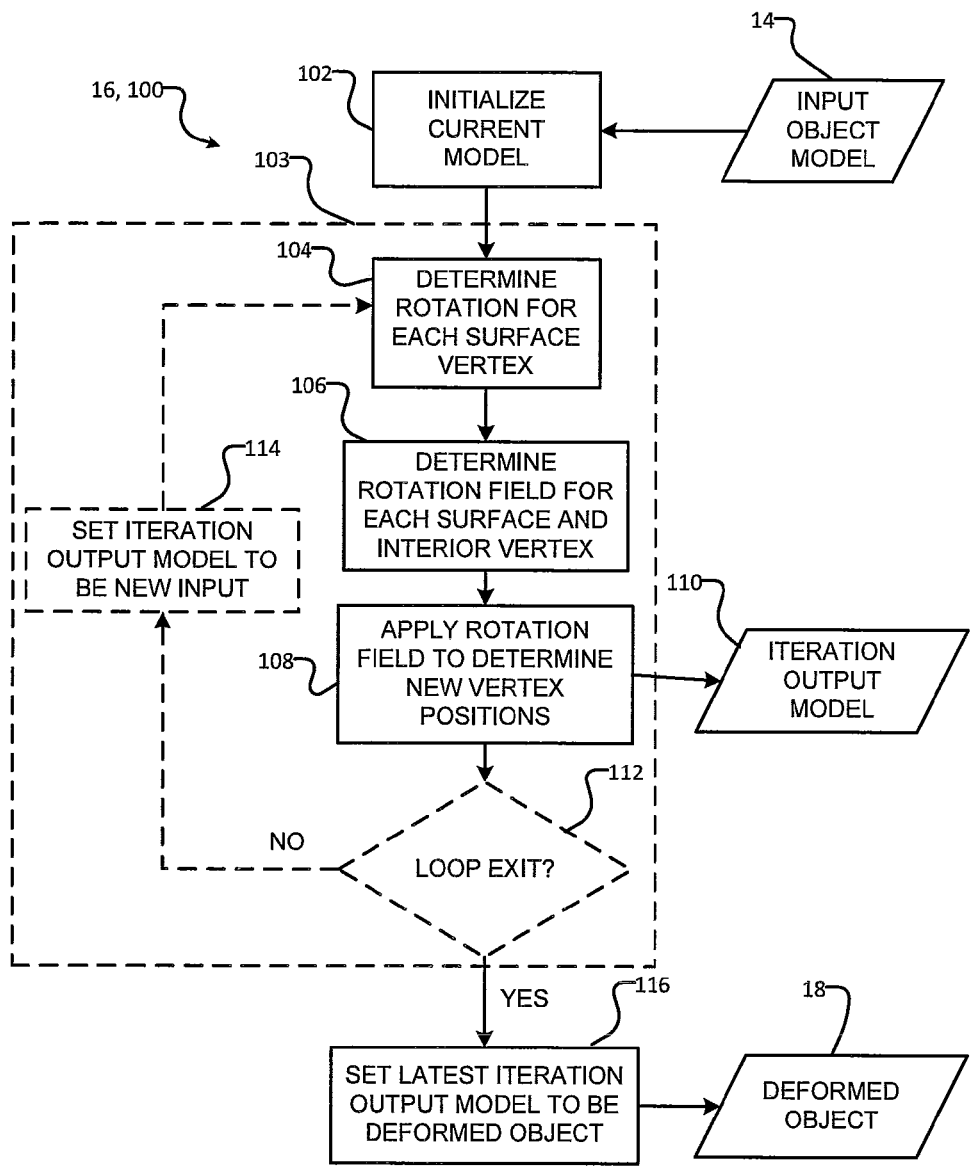
FIG. 2 is a schematic depiction of a method for deforming the input model to provide a deformed object representation that may be used in the FIG. 1 method according to a particular embodiment.

FIG. 2 is a schematic depiction of a method 100 for implementing block 16 of method 10 (i.e. using input model 14 to generate deformed object 18) according to a particular embodiment. Method 100 commences in block 102 which involves initializing a current model corresponding to the input object. In the illustrated FIG. 2 embodiment, block 102 involves initializing the current model to be input model 14 received in block 12 (see FIG. 1). In the illustrated FIG. 2 embodiment, block 102 involves initializing the current model of an iterative process described in more detail below. In some embodiments, block 102 may optionally involve selecting and/or receiving a global Cartesian coordinate system (i.e. global (±X,±Y,±Z) axes) which will be used for the polycube representation of the input object. The block 102 selection of the global Cartesian coordinate system may be provided by a user, may be automatically assigned or may be part of input object model 14. This block 102 selection of global Cartesian coordinate system may be based on the shape of the input object as represented by input model 14. For example, if the input model 14 can be interpreted to have one or more flat (i.e. planar) surfaces, then the block 102 coordinate system selection may be made such that such planar surfaces correspond to particular axes of the global coordinate system. In some embodiments, other criteria relating to the shape of input model 14 may be used to select the global Cartesian coordinate system. Selection of a global Cartesian coordinate system is not necessary. In some embodiments, the block 102 global Cartesian coordinate system may be received (e.g. as part of input model 14 or otherwise) or arbitrarily assigned.

Method 100 of the illustrated embodiment, then proceeds to a loop 103 which begins in block 104. Block 104 involves determining a suitable three-dimensional rotation for each surface point (e.g. each surface vertex) in the current model. In the first iteration of loop 103, the current model is the block 102 initialized model (e.g. input model 14). As explained in more detail below in subsequent iterations of loop 103, the current model used in block 104 will be the iteration output model 110 of the previous iteration. In some embodiments, for each surface vertex in the current model, block 104 involves determining a rotation (also referred to as a deformation gradient or a rotation value) which comprises a minimum three-dimensional rotation which will rotate a normal vector corresponding to the surface vertex normal such that the surface vertex normal aligns with a closest one of the six directions corresponding to the global Cartesian axes (±X,±Y,±Z). For each surface vertex, selecting the global Cartesian axis to be the closest axis to the surface vertex normal may ensure that the corresponding block 104 rotation comprises a minimum rotation for each surface vertex. The block 104 rotations corresponding to the surface vertices may be referred to as anchor rotations to distinguish them from rotations at interior vertices described in more detail below.

There are a variety of techniques which may be used to determine an initial normal vector corresponding to a surface vertex. Particular embodiments of the invention may use any suitable technique for determining initial normal vectors corresponding to surface vertices. In particular embodiments, the initial normal to a surface vertex may comprise a function of the normal vectors of the surface faces adjacent to the surface vertex. In some embodiments, this function may comprise an average of the normal vectors of the surface faces adjacent to the surface vertex. In one particular exemplary and non-limiting embodiment, this function may comprise a weighted average of the normal vectors of the surface faces adjacent to the surface vertex, wherein the weights may be prescribed by any suitable metric such as the size of the surface faces and/or the like. Any such technique may be used to define the initial surface normal vectors used for the surface vertices in block 104.

In some embodiments, for one or more surface vertices in the current model, the corresponding block 104 rotation may additionally or alternatively be based on other suitable criteria. By way of non-limiting example, for a particular surface vertex, such additional or alternative criteria may comprise: the block 104 rotations for one or more neighboring vertices; the block 104 rotations for one or more other vertices which, in the context of the input object and/or the current model, have other characteristics related to those of the particular surface vertex; the proximities of one or more neighboring vertices; the proximities of one or more other vertices which, in the context of the input object and/or the current model, have other characteristics related to those of the particular surface vertex; consistency of the rotation with validity characteristics (e.g. whether a rotation will meet necessary or desirable conditions for a valid polycube); other characteristics of the input object and/or the current model; and/or the like. In some non-limiting example embodiments, the block 104 rotations for a particular vertex or a particular group of neighboring vertices may additionally or alternatively be based, in part, on the rotations for a corresponding vertex or group of corresponding vertices having similar shapes in the input object. In this context and in some embodiments, vertices determined to be neighboring vertices of a particular surface vertex may be determined by any suitable criteria or metric (e.g. a Euclidian distance threshold, a path length distance threshold, a threshold corresponding to a number of edges and/or the like).

It is not necessary that block 104 determine a rotation for every surface vertex. Surface vertices for which a rotation is not determined in block 104 may be treated like interior vertices described in more detail below. In some embodiments, block 104 expressly omits surface vertices consider to represent sharp features. There are a variety of techniques which may be used to determine whether a particular surface vertex corresponds to a sharp feature. In one particular and non-limiting embodiment, a particular surface vertex may be determined to correspond to a sharp feature (and thus omitted from block 104) when the dihedral angle across an edge which includes the particular vertex (i.e. the angle between the surface normals of faces on either side of the edge) is greater than suitable threshold (which may be user-configurable). In some embodiments, other criteria may be used to define when a vertex corresponds to a sharp feature and is omitted from block 104. In some embodiments, one or more other surface vertices (i.e. other than those corresponding to sharp features) may be omitted from block 104. Surface vertices for which a rotation is not determined in block 104 may be treated as interior vertices for the remainder of the current iteration of loop 103.

After determining the anchor rotations for the surface vertices in block 104, method 100 proceeds to block 106 which involves smoothly propagating the block 104 rotations to interior points (e.g. interior vertices) of the current model to thereby define a volumetric rotation field—i.e. a volumetric field having a rotation associated with each point (e.g. each vertex) in the field. During block 106, the block 104 surface vertex anchor rotations are permitted to change to balance the desirability of providing a low-distortion rotation field in block 106 (e.g. a rotation field that introduces relatively low-distortion as compared to input model 14 and/or as compared to the current iteration; and/or a smoothly varying rotation field that is not discontinuous and/or does not otherwise exhibit overly high spatial rates of change). This tradeoff between permitting the block 104 surface vertex rotations to vary and achieving a low-distortion rotation field in block 106 may be configured as an optimization problem which balances these competing objectives.

In particular embodiments, the block 106 optimization problem can be configured as a least squares problem as discussed in more detail below. The inputs to the block 106 optimization problem may comprise the current model and the block 104 surface vertex anchor rotations. The desired outputs of the block 106 optimization problem may comprise three-dimensional rotations for each vertex (interior vertices and surface vertices) in the current model. The objective function for the block 106 optimization problem may comprise: a first term or function that assigns cost to changing the block 104 surface vertex anchor rotations (e.g. a sum of the squared amount of the change for each surface vertex); a term or function that assigns relatively high cost to situations where adjacent vertices are to be assigned relatively different rotations and relatively low cost to situations where adjacent vertices are to be assigned relatively similar (i.e. smooth) rotations (e.g. a cost that is positively correlated with the amount of change between adjacent vertices); a term or function that assigns relatively high cost to relatively high magnitude rotations and relatively low cost to low magnitude rotations (e.g. a cost that is positively correlated with the magnitude of the rotation); and/or the like. The individual cost terms or functions of the block 106 objective function may be assigned different relative weights—e.g. to prescribe a relative preference for the objective of low-distortion deformations over the objective of minimizing changes to the block 104 surface vertex anchor rotations or vice-versa. Such weights may be user-configurable. In particular embodiments, the low-distortion objective may be assigned a relatively high weight which may be used to force alignment of deformed object 18 (FIG. 2) to the global Cartesian axes over several iterations of loop 103.

In some embodiments, the objective function of the block 106 optimization problem may include additional or alternative cost terms or functions, which may also be assigned relative weights. By way of non-limiting example, such additional or alternative cost terms or functions may include: cost terms or functions that assign costs to rotations that would not conform to a valid polycube; cost terms or functions that assign costs for changing rotations that are initially relatively low-deformation into high-deformation rotations; cost terms or functions that assign costs for changing rotations that are initially smoothly varying (i.e. where there are relatively small rotations between adjacent vertices) into non-smoothly varying rotations (i.e. where there are relatively large rotations between adjacent vertices); cost terms or functions that assign costs based on the similarity of rotations as between vertices (e.g. similarity of rotations applied to neighboring vertex normals or to the normals of vertices known to exhibit similar local shapes, etc.); and/or the like.

In some embodiments, the block 106 optimization problem may consider vertices to be adjacent to one another if they share a common edge. In other embodiments, other suitable metrics of adjacency could be used in the block 106 optimization problem. By way of non-limiting example, vertices could be considered to be adjacent based on positional proximity, having fewer than a threshold number (e.g. 2 or 3) of edges between them, and/or the like. In general, block 106 may use any suitable measure of adjacency between vertices.

In some embodiments, the block 104 and block 106 rotations may be represented by quaternions of the form $q=[q_x; q_y; q_z; q_w]^T$; $\|q\|=1$. Such quaternions may be operated on using normalized linear interpolation with positive, convex weights. These choices allow standard linear solvers to be used on each quaternion component (i.e. $q_x$, $q_y$, $q_z$, $q_w$) independently when propagating the block 104 surface vertex anchor rotations into the interior vertices of the object volume as part of block 106. Quaternion representations may be ambiguous in the sense that q and −q represent the same rotation. This ambiguity admits the possibility of generating zero-norm (or degenerate) quaternions when using linear interpolation. Degenerate quaternions may cause undesirable singular features within the block 106 rotation field, since degenerate quaternions represent the only places where the otherwise smoothly varying orthogonal bases represented by the quaternion field break down.

Some embodiments may suppress this ambiguity by coherently-orienting the block 104 surface vertex anchor rotations used in constructing the block 104 quaternions. When constructing such a quaternion from a rotation matrix R, particular embodiments of block 104 may comprise first reordering and reflecting the columns of R to maximize its trace. This process guarantees that the scalar components $q_w$ of the quaternions are strictly positive in all cases, which ensures that $\|q\|>0$ and thus the quaternion is non-degenerate. The use of positive, convex weights then ensures that no quaternion obtained via interpolation (either within a tetrahedron or while propagating gradients in block 106) is degenerate. These optional steps can help to ensure that the resulting block 106 rotation field is singularity free. Coherently-orienting the quaternions also keeps the block 106 rotations close to one another, reducing the approximation error introduced by using linear interpolation in block 106 rather than more complex, non-linear methods.

In some embodiments, block 106 comprises propagating the block 104 surface vertex anchor rotations to interior vertices by solving a Laplace equation for each quaternion component (i.e. $q_x$, $q_y$, $q_z$, $q_w$). In particular embodiments, block 106 comprises solving the system of equations for each quaternion component in a least squares sense. By way of non-limiting example, in block 106 an objective function may be constructed for each quaternion component based on: weighted least squares differences between the block 104 surface vertex rotations and the output surface vertex rotations; and weighted least squares differences between the output vertex rotations of adjacent vertices. As discussed above, the weights of these objective function terms may be user configurable and, in some embodiments, the weights assigned to the cost of changing the block 104 surface vertex anchor rotations may be made relatively low to force alignment of deformed object 18 (FIG. 2) to the global Cartesian axes over several iterations of loop 103. Uniform weights may be used to discretize the Laplacian operator since input model 14 may typically comprise a fairly uniform tet-mesh. This is not necessary, however, and in some embodiments non-uniform weights could be used to discretize the Laplacian operator.

The output of block 106 is a smoothly varying volumetric rotation field—i.e. a volumetric field having a rotation (deformation gradient) associated with each point (e.g. each vertex) in the field, where the rotations are not discontinuous and/or do not otherwise exhibit overly high spatial rates of change. The block 106 vertex rotations may be represented as quaternions and may be normalized. The block 106 rotation field may be free of singular features because of the above-discussed coherent orientation of the block 104 surface vertex anchor rotations.

Method 100 then proceeds to block 108 which involves application of the block 106 rotations to determine new positions for the vertices of the current model and to output these new vertex positions as iteration output model 110. Block 108 may comprise integrating the block 106 deformation gradients (rotations) to obtain new vertex locations. For each edge (i, j) between vertices having original coordinates $\tilde{v}_i$ and $\tilde{v}_j$, the new edge vector $v_i - v_j$ can be expressed as $v_i - v_j = \frac{1}{2}(\nabla_i + \nabla_j) \cdot (\tilde{v}_i - \tilde{v}_j)$ where $\nabla_i$ and $\nabla_j$ are the rotation matrices corresponding to the block 106 rotations for the $i^{th}$ and $j^{th}$ vertices. Using this formulation for all edges in the current model results in a Poisson equation, which, for the $i^{th}$ vertex, has the form:

$$v_i - \frac{1}{N}\sum_{j=1}^{N} v_j = \frac{1}{N}\sum_{j=1}^{N} \frac{\nabla_i + \nabla_j}{2} \cdot (\tilde{v}_i - \tilde{v}_j). \quad (1)$$

where the index j runs over the N immediate neighbors of the vertex i (i.e. neighbors of the vertex i connected by a single edge). In some embodiments, equation (1) is expressly solved in block 108 to yield the new vertex positions $v_i$ for each vertex of the current model. Fixing one vertex is sufficient to make equation (1) non-singular. Typically, this is done by selecting one vertex to be the origin of the global Cartesian coordinate system. In some embodiments, the equation (1) system of equations corresponding to each of the Cartesian axes (i.e. x, y, z) may be solved independently.

In some embodiments, block 108 comprises attempting to orient each edge of the current model with its new preferred direction (i.e. with the block 106 rotations) while maintaining the length of the edges. Using the same notation as equation (1) above (i.e. original vertex coordinates $\tilde{v}_i$ and $\tilde{v}_j$, new vertex coordinates $v_i$ and $v_j$, and rotation matrices $\nabla_i$ and $\nabla_j$), such embodiments may (in block 108) solve for new vertex coordinates $v_i$ and $v_j$ by minimizing:

$$\sum_{i,j} \left( (v_j - v_i) - \left(\frac{\nabla_i + \nabla_j}{2}\right) \cdot (\tilde{v}_i - \tilde{v}_j) \right)^2 \quad (2)$$

over all mesh edges (i, j).

The output of block 108 is an iteration output model 110 having new vertex positions $v_i$ determined by solving equation (1) (in some embodiments) or equation (2) (in some embodiments). Iteration output model 110 is deformed from the current model in the sense that iteration output model 110 has greater surface alignment with the global Cartesian axes, but iteration output model 110 is not perfectly axis aligned because of the block 106 tradeoff between permitting the block 104 surface vertex rotations to vary (from the block 104 rotations which would provide axial alignment) and achieving a low-distortion rotation field in block 106.

After determining iteration output model 110 in block 108, method 100 proceeds to block 112 which involves an inquiry into whether suitable loop exit criteria are met. Any suitable loop exit criteria may be used in block 112. By way of non-limiting example, suitable loop exit criteria may comprise: a threshold number of iterations of loop 103; differences between the current model and iteration output model 110 being below a threshold; differences between iteration output model 110 and a valid polycube being below a threshold; a suitable temporal threshold; a user-initiated loop exit; and/or the like. Typically, the block 112 inquiry will be negative for the first number of iterations through loop 103 and method 100 will loop back to block 104 via block 114 where iteration output model 110 is set to be the current model for the next iteration of loop 103. Blocks 104, 106 and 108 are then repeated with the new current model. In some embodiments, the various loop 103 iterations may be performed efficiently by factorizing and storing the various systems of equations.

After a number of iterations, the block 112 loop exit criteria will be satisfied and the block 112 inquiry will be positive such that method 100 will proceed to block 116 where the latest iteration output model 110 is set to be deformed object 18 (see deformed object 18 as the output of block 16 in FIG. 1). It is not strictly necessary that method 100 comprise a plurality of iterations. In some embodiments and/or in some particular applications, method 100 can be performed in one iteration involving the procedures of blocks 104, 106 and 108 where the block 108 iteration output model 110 is set to be deformed object 18 after the single iteration.

Figure 2A:
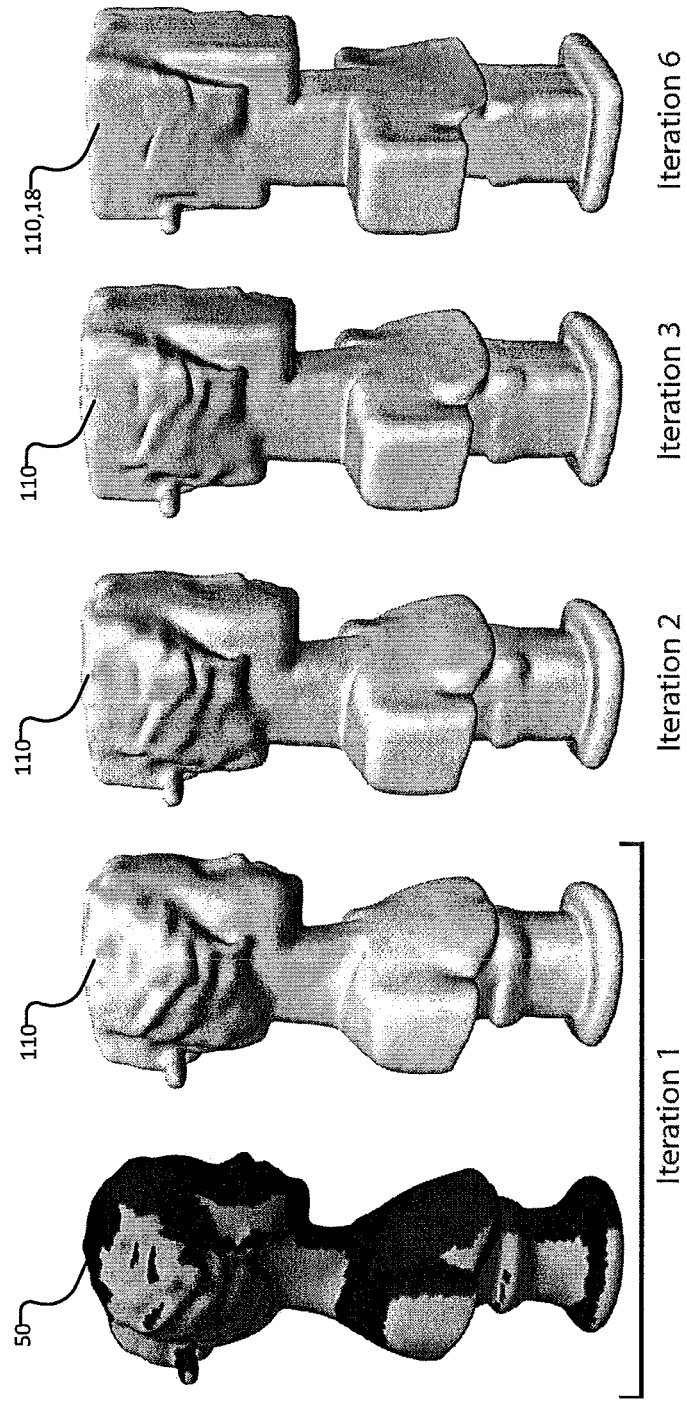
FIG. 2A shows several iterations of the application of the FIG. 2 method to the FIG. 1A example input object.

FIG. 2A shows several iterations of the application of method 100 to the example input object 50 of FIG. 1A. Each iteration of loop 103 produces an iteration output model 110 which more closely resembles a polycube, but which balances the competing objectives of providing an iteration output model 110 whose surfaces have normal vectors closely aligned with one of the global Cartesian axes (±X, ±Y,±Z); and providing relatively low-distortion variations to the model in each iteration. It can be seen from FIG. 2A, that each successive iteration output model 110 is relatively more axis-aligned and that the iteration output models 110 begin to converge after a number of iterations.

Figure 3:
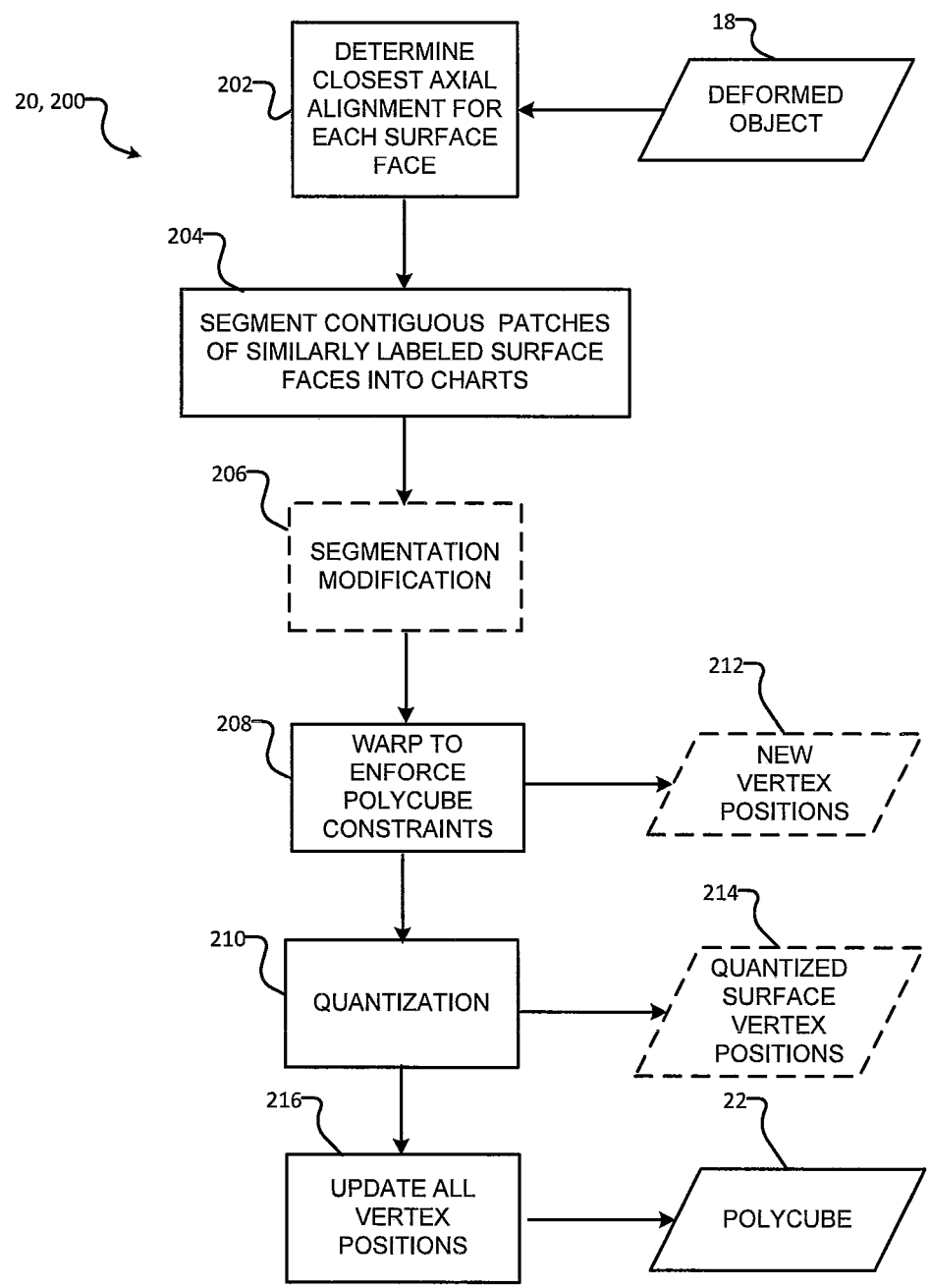
FIG. 3 depicts a method for using the deformed object representation to generate polycube which may be used in the FIG. 1 method according to a particular embodiment.

FIG. 3 depicts a method 200 for implementing block 20 of method 10 (i.e. using deformed object 18 to generate polycube 22) according to a particular embodiment. Method 200 starts in block 202 which involves determining the closest axial alignment for each surface face of deformed object 18. In the case where input model 14 and deformed object 18 are represented by tet-meshes, the surface faces of deformed object 18 are triangles. Block 202 may then involve, for each surface face of deformed object 18, looking at the normal vector corresponding to the surface face and determining which one of the six directions corresponding to the global Cartesian axes (±X,±Y,±Z) is most closely aligned with the normal vector. Block 202 may be said to comprise labeling the surface faces of deformed object 18, where the direction corresponding to the global Cartesian axis most closely aligned with the normal vector of a particular surface face may be understood to be the label for that particular surface face.

Method 200 then proceeds to block 204 which involves grouping (also referred to as segmenting) various surface faces into contiguous surface patches (also referred to as charts), such that the block 202 labels are the same for each member of a block 204 chart. Block 204 may be implemented, for example, by starting with a particular surface face and looking at the block 202 labels for the neighboring surface faces (e.g. surface faces that share a corresponding edge or vertex with the particular surface face). If a neighboring surface face has the same block 202 label as the particular surface face, then the two surface faces may be assigned to the same chart. If not, then the two faces may be assigned to different charts. This process may be continued until all of the surface faces of deformed object 18 are assigned to a chart. As explained in more detail below, the block 204 charts may correspond with polycube faces and boundaries between the block 204 charts may corresponding to polycube edges and vertices.

In some embodiments, a number of optional steps may be performed in block 204 which may simplify further processing and/or otherwise improve the performance of methods 10, 10A, 200. In some embodiments, jaggedness of the block 204 segmentation may be reduced using one or more optional procedures which may be performed in block 204. For example, in some embodiments, the jaggedness of the block 204 segmentation may be reduced by relabeling surface faces along chart boundaries, if these chart boundary surface faces meet suitable relabeling criteria. In particular embodiments, if a particular chart boundary surface face has two (or more) immediately neighboring faces with a common label that is different from that of the particular chart boundary surface face, then the particular chart boundary surface face may be relabeled to share the common label of its neighbors. As another example, in some embodiments, charts that are sufficiently small may also be relabeled as part of block 204, if these charts meet suitable smallness criteria. In particular embodiments, suitable smallness criteria used to determine small charts that may be relabeled in block 204 include, by way of non-limiting example: a chart that is bounded by two or fewer edges, a chart that has an area that is less than a suitable threshold, a chart that has one or more linear dimensions less than suitable threshold(s) and/or the like. Charts determined to be small charts can be relabeled by flood filing the faces of the small charts with the labels of neighboring charts.

Method 200 may comprise optional further modification of the block 204 segmentation in optional block 206 which is described in more detail below. In some embodiments and/or in some particular applications further segmentation modification (in block 206) is not required and method 200 proceeds to block 208 which involves warping deformed object 18 (e.g. the positions of the vertices of deformed object 18) to enforce polycube constraints. Block 208 may be referred to as position-driven deformation. The block 208 polycube constraints may require that after being deformed in block 208, each chart is constrained to a plane (i.e. such that all the vertices of the faces in the chart are located on the plane) and that the plane have a normal vector aligned with one of the six directions of the global Cartesian axes ($\pm X, \pm Y, \pm Z$).

In some embodiments, block 208 may be configured as an optimization problem. The inputs to the block 208 optimization problem may comprise deformed object 18 and the charts of the block 204 segmentation (including the corresponding labels for each chart). The desired output of the block 208 optimization problem is to deform the positions of the vertices of deformed object 18 obtain new vertex positions 212 that will meet the polycube constraints. These polycube constraints may impose constraints on the block 208 optimization problem. Such constraints may require that the new vertex positions 212 for the faces corresponding to a particular chart be constrained to a plane and that the plane must have a normal vector aligned with one of the six global Cartesian axes. The objective function of the block 208 optimization problem may comprise a first term or function which assigns cost to moving vertices (e.g. where movement of a relatively greater number of vertices is assigned a relatively greater cost and/or where movement of a vertex by a relatively greater distance is assigned a relatively greater cost). In some embodiments, the block 208 warping may be implemented by introducing a new variable for each chart (referred to as a chart coordinate) into the Poission equation formulation of equation (1) and/or into the formulation of equation (2). All vertices on a particular chart can be constrained to have the same chart coordinate. For example, for a chart constrained to be oriented in the +X axial direction, the chart coordinate may be x=$\alpha$ for all vertices on the chart which corresponds to a chart being in a plane parallel to the Y-Z plane.

In some embodiments and/or applications, the objective function of the block 208 optimization problem may additionally or alternatively comprise a second term or function which assigns cost to changing the ordering and/or distance(s) between nearby charts aligned to the same global Cartesian axis (e.g. nearby charts aligned to the X-axis (i.e. +X and/or −X), nearby charts aligned to the Y-axis (i.e. +Y and/or −Y) and/or nearby charts aligned to the Z-axis (i.e. +Z and/or −Z). This cost term or function may be referred to as a distance preservation cost term or a distance preservation constraint and can mitigate self-intersections which may occur if surfaces which are relatively close to one another are axially aligned. In the context of the distance preservation cost term or function, the concept of "nearby" can be determined by any suitable metric. By way of non-limiting example, whether two axially aligned charts are considered "nearby" may be determined by positional proximity (path length proximity and/or Euclidian proximity), by the number (e.g. a threshold number, such as 2 or 3) of edges between them, and/or the like. In some embodiments, a metric associated with the "nearness" of any two axially aligned charts may be used as a weighting factor within this distance preservation cost term or function.

Where the cost function of the block 208 optimization problem involves multiple cost terms or functions then these multiple cost terms or functions may be assigned different weights. In some embodiments, some such weights may be user-configurable.

As discussed above, distance preservation costs or constraints may be used in some embodiments of block 208 to preserve the ordering and distance between nearby charts aligned to the same Cartesian axis. In some embodiments, distance may be measured using a per-vertex approximate Voronoi diagram of charts which may be built within the object volume that stores at the vertices the closest vertex on the closest chart. Edges connecting Voronoi regions of two similarly labeled charts (i.e. where similarly labeled charts refer to charts aligned with the X-axis (+X and/or −X), charts aligned with the Y-axis (+Y and/or −Y) and/or charts aligned with the Z-axis (+Z and/or −Z)) may indicate distance preservation constraints between the charts, with distance equal to the distance along the chart axis between the closest points. These distances may be averaged over all edges having a vertex in each Voronoi region of a pair of charts, and used in the formulation of the distance preservation cost or constraint associated with the pair of similarly labeled charts. In some embodiments, the weight of each distance preservation cost or constraint may be based on a Gaussian function of the distance between the pair of charts $$e^{\frac{-max(d_i-min_d,0)^2}{\sigma^2}},$$

where: max($\alpha,\beta$) is a maximum operator which returns the maximum of its inputs $\alpha$ and $\beta$; $d_i$ is the distance between $i^{th}$ pair of similarly labeled charts; and $min_d$ and $\sigma$ are parameters (which may be user-configurable) and which may be used to set the sharpness of the falloff of the Gaussian weighting function. These parameters may be set relative to the unit mesh length of the desired hex-mesh output.

The output of block 208 is a set of new vertex positions wherein the new surface vertex positions 212 satisfy the aforementioned polycube constraints. In some embodiments, for each particular chart, new surface vertex positions 212 may comprise a chart coordinate that is shared for all of the surface vertices corresponding to the particular chart. Method 200 may then proceed to block 210 which may involve quantizing or otherwise rounding off the surface vertex positions 212 for each chart. In some embodiment, block 210 may involve obtaining a set of chart coordinates (i.e. a chart coordinate for each chart and for the surface vertices belonging to each chart). In some embodiments, a set of chart coordinates may be obtained as a part of block 208. Whether such chart coordinates are obtained in block 208 or block 210, block 210 may involve rounding such chart coordinates to the nearest integer (in the polycube domain). The output of block 210 is a set of quantized surface vertex positions 214, where each surface vertex position comprises at least one integer coordinate corresponding to the at least one chart to which the surface vertex belongs.

Method 200 then proceeds to block 216 which involves determining the final positions of the surface vertices and the final positions of the interior vertices in polycube 22. Block 216 may comprise determining these vertex positions using a Laplace equation. The known quantized (e.g. integer) chart coordinates may be used as constraints for surface vertices on each chart. The Laplace equation used in block 216 may be weighted or otherwise discretized in a manner which tends to minimize the deformation of the mesh and/or to neighboring vertices of the mesh. In particular embodiments, mean value coordinates in 2D (surface vertices) and 3D (interior vertices) may be used to weight or otherwise discretize the Laplace operator. The output of block 216 (e.g. from solving the Laplace equation) is polycube representation 22. Polycube representation 22 may comprise a tet-mesh having the same connectivity as input model 14. This similar connectivity between polycube 22 and input model 14 may facilitate mapping between input model 14 and polycube 22 as discussed in more detail below.

As discussed above, method 200 comprises optional block 206 which can be used to modify the block 204 segmentation in some circumstances. Segmentation modification in block 206 may be used to obtain a segmentation that admits a polycube deformation (e.g. a block 208 deformation which meets the polycube constraints) in circumstances where the required properties of orthogonal polyhedra may not be fully known. In some embodiments, the block 206 segmentation modification may involve the application of a "greedy" heuristic (i.e. a heuristic that does not admit tradeoffs or balancing with other considerations) based on the observation that polycube edges are constrained to be axis aligned and straight. Deformed object 18 output from block 16 (rotation-driven deformation method 100) is usually close to satisfying this requirement in the sense that deformed object 18 comprises nearly planar charts with nearly straight edges; however, the bock 206 segmentation modification may account for circumstances where deformed object 18 does not exhibit these properties.

A first circumstance where the block 206 segmentation modification may be applied in is in the case where a single chart should map simultaneously to opposite sides of the final polycube. This is the case in the example object 300 of FIG. 4A, where chart 302 should map to the top (e.g. +Z direction) and bottom (e.g. −Z direction) of the polycube. This circumstance may be referred to a multi-orientation chart. Multi-orientation charts have two U-shaped edges which violate the edge-straightness heuristic which forms a basis of the block 206 segmentation modification. To handle this multi-orientation charts, block 206 may involve modifying the segmentation by introducing a new chart to split the multi-orientation chart into two separated charts, with each having a single orientation. This is shown in FIG. 4B, where a chart 304 is introduced in boundary location 306 (i.e. the location where the orientation of chart 302 changes), and in FIG. 4C, where separating chart 304 splits chart 302 into single orientation chart 302A (having a +Z orientation) and single orientation chart 302B (having a −Z orientation).

In some embodiments, multi-orientation charts are detected by introducing orientation labels for each surface face to indicate whether its normal vector points in the positive or negative direction of the axis to which it maps. Multiple-orientation charts may then be split along the boundary where the orientation labels change—e.g. along boundary 306 of FIG. 4B. A separating chart (e.g. chart 304) may be introduced along the splitting boundary to separate the two resulting charts (e.g. charts 302A, 30B of FIG. 4C). The width of the separating chart may be set equal to a unit edge-length parameter for the desired output mesh, which may be user-configurable. The axis-assignment of the separating chart may found by considering its four neighboring charts. If a first pair of neighboring charts have assignments on a single axis (e.g. ±Z) and a second pair of neighboring charts have assignments on a different single axis (e.g. ±Y), then the separating chart is assigned an orientation on the remaining axis (e.g. ±X). Otherwise, the separating chart may be assigned an orientation along an axis from one of the unmatched neighboring charts—i.e. a neighboring chart that does not have another chart oriented in the opposing direction along the same axis. Once detected, multi-orientation charts may be split immediately.

A second circumstance where the block 206 segmentation modification may be applied in is in the case where charts are highly non-planar. An example of a highly non-planar chart is shown in object 310 of FIG. 5A where chart 312 has an S-shaped edge. Highly non-planar charts may or may not allow topologically valid polycubes to be formed, but can introduce considerable distortion when planarity constraints are enforced (e.g. in block 208 of method 200 (FIG. 2)). In some embodiments, block 206 may involve splitting highly non-planar charts to reduce distortion once planarity constraints are enforced.

In some embodiments, highly non-planar charts may be detected by examining the chart edges and looking for "extrema"—e.g. a point where a chart boundary doubles back on itself and/or a point where the orientation of a chart boundary changes abruptly with respect to one of the global Cartesain axes (e.g. with respect to its label axis). An example of such an extremum is shown at 314 of FIG. 5A. This search may be performed on smoothed copies of the chart edges (which may be subsequently discarded). Such edge smoothing (which may be implemented by any suitable smoothing process) may help to avoid detecting spurious extrema introduced by edge jaggedness. Extrema indicative of highly non-planar charts typically occur at the end of what is referred to as "wedges" (see wedge 316 in FIG. 5A). Wedges may vary in size depending on how non-planar the adjacent charts are. The severity of an extremum may be characterized by the area of its corresponding wedge, which in turn may be approximated by the triangle formed by the extremum itself and its immediately adjacent extrema on either side (or the chart-edge endpoint if there is not one on either side). Directly enforcing planarity constraints on charts adjacent to wedges may tend to flatten the wedges to lines and cause corresponding distortion. In some embodiments, wedges are resolved by cutting (e.g. splitting) the concave chart starting at the extremum and introducing a separating chart along the cut.

Block 206 may involve processing extrema in decreasing order of severity. In some embodiments, candidate paths are found along which to cut the concave chart adjacent to an extremum by searching from the extremum through the corresponding chart for boundary vertices of the chart (i.e. vertices along the chart edge) at which to terminate the cut. Such chart boundary vertices may be referred to as candidate termination vertices. A cost may be assigned to each of the candidate termination vertices of the chart. Such a cost may be based on one or more of: a path length between the extremum and the candidate termination vertex; an alignment of the proposed cut with one the global Carteisan axes; and/or the like. In one particular non-limiting embodiment, the cost assigned to a cut from an extremum vertex position a to a candidate termination vertex position b is given by: $C(a,b)=\alpha L(a,b) (1.1-\text{Align}(a,b))$ where $L(a,b)$ is the cut-path length between a and b; and $\text{Align}(a,b)$ is the maximum dot product of $$\frac{b-a}{\|b-a\|}$$

with the global Cartesian axes to favor axis-aligned cuts. The parameter a may be set to 0.5 for cuts that connect two extrema, and 1 otherwise to favor cuts that resolve multiple extrema simultaneously.

Figures 5A, 5B, 5C:
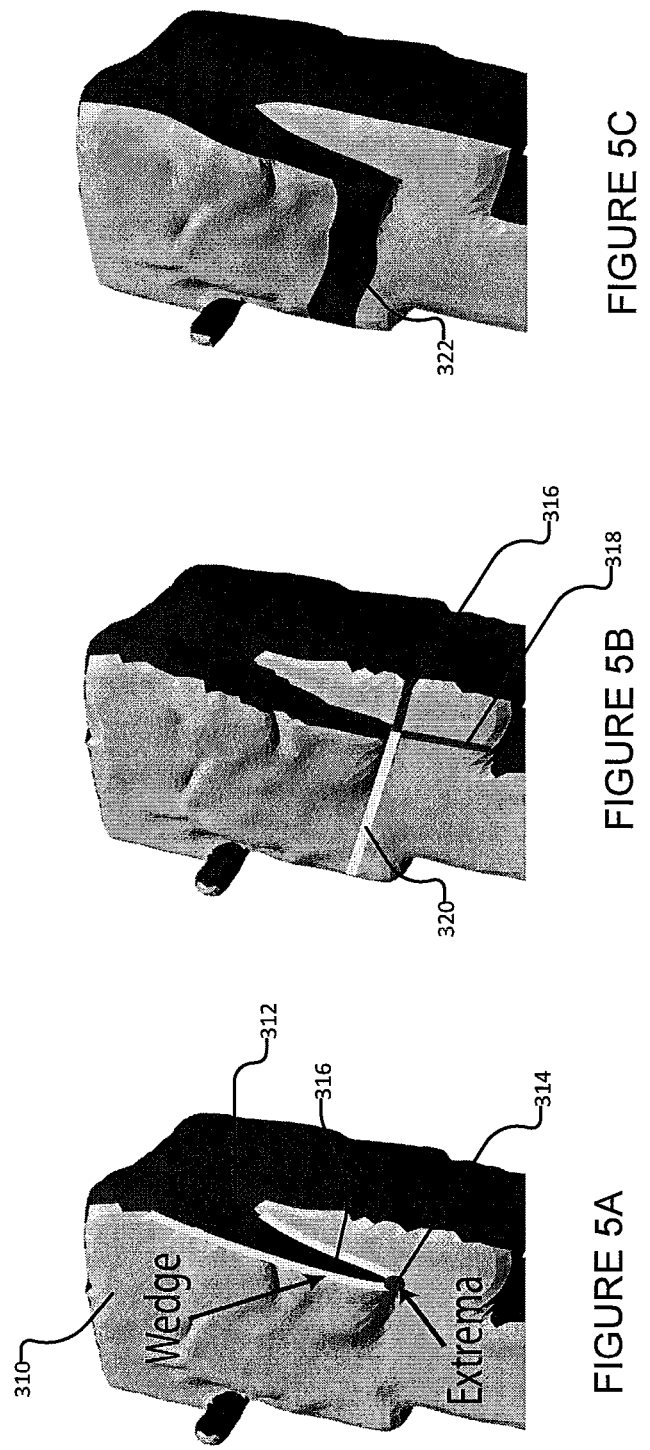
FIGS. 5A-5C (collectively, FIG. 5) show an example of how a segmentation may be modified by splitting to deal with highly non-planar charts.

Valid cuts may be selected to be those that would introduce separation charts having four or more neighboring charts. FIG. 5B shows possible cuts 316, 318, 320. Only cut 320 is valid, since it is the only one of cuts 316, 318, 320 which would introduce a separation chart having four or more neighboring charts. The candidate termination vertex having the lowest cost while also satisfying the validity constraints may be selected to be the termination vertex for a cut. In some embodiments, costs may also be assigned other vertices (i.e. vertices which are not on chart boundaries or which are otherwise not candidate termination vertices). A cut may then be formed by working backward from the selected termination vertex to the extremum vertex by selecting intervening vertices with the lowest costs to define the cut from the selected termination vertex, through the intervening vertices and to the extremum vertex. In some embodiments, this search for the lowest cost valid cut may comprise using a Dijkstra shortest path algorithm, which may yield a minimum cost candidate termination vertex without having to independently evaluate the cost of each candidate termination vertex. The first candidate termination vertex located by the Dijkstra shortest path algorithm which also satisfies the validity criteria may be selected to be the termination vertex.

FIG. 5C shows such a separating chart 322 formed by a corresponding separation cut. The axis assignment of the separation chart may be selected based on neighboring charts in a manner similar to that discussed above for resolving multi-orientation charts if first and second pairs of neighboring charts have orientations along the same axis. Otherwise, the assignment from the chart forming the wedge may be assigned to the separating chart. The width of the separating chart may be set on the basis of one or more of the characteristics of the wedge. In one particular non-limiting embodiment, the width of the separating chart may be set to half of the width of the wedge, defined as a two-dimensional distance between the wedge endpoints in the plane corresponding to the two adjacent chart axis assignments. For example, if the extremum is on an edge between charts assigned to X and Y, the two-dimensional distance between the endpoints in the XY plane may be used as a basis for the width of the separation chart.

Returning to FIG. 1, polycube representation 22 (which is the output of block 20 and method 200 (FIG. 3)) is the output of method 10. As discussed above, polycube 22 may be used for a variety of applications which may include, by way of non-limiting example: storage of texture mapping for the surfaces of input model, storage of volume data relating to the input object, volumetric texturing, spline fitting, volumetric data compression, volume rendering for the input object, function interpolation, multi-resolution meshing, texture mapping, quadrilateral surface meshing, other geometry processing tasks corresponding to the input object and/or the like.

Figure 6:
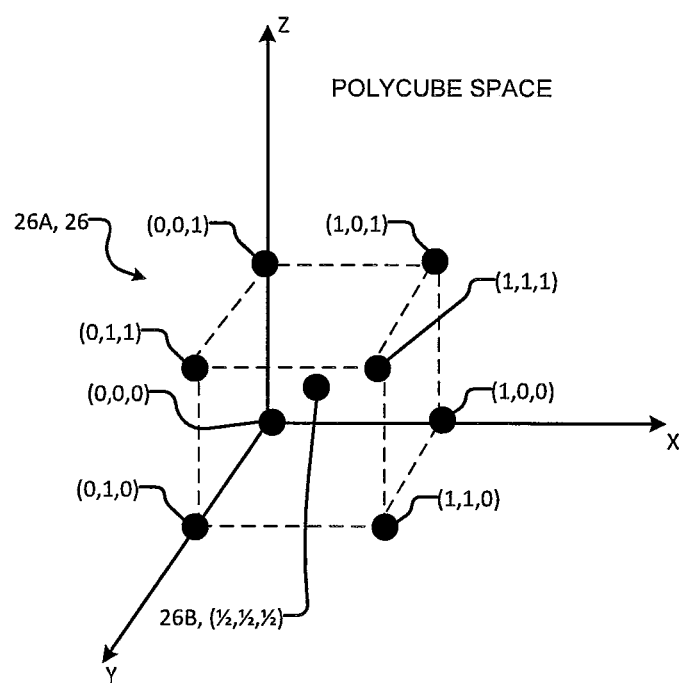
FIG. 6 is a schematic depiction of one exemplary hexahedron in a hexahedral grid that may be generated in a polycube domain as a part of the FIG. 1 method.

One particular application of polycube 22 is in the generation of a hex-mesh 30 corresponding to input model 14. FIG. 1 schematically depicts a method 10A for using hex-mesh 30 generated by method 10 to generate such a hex-mesh 30 according to a particular embodiment. Block 24 of the illustrated embodiment of method 10A involves generating a hexahedral grid 26 corresponding to polycube 22 in the polycube space (polycube domain). The block 24 generation of hexahedral grid 26 in polycube space may involve designating points in the polycube space having integer coordinates to represent the vertices of the hexahedrons of hexahedral grid 26. One example hexahedron 26A of hexahedral grid 26 in the polycube domain and its corresponding vertices are shown in FIG. 6. The eight vertices of exemplary hexahedron 26A include those points having integer coordinates (0,0,0), (1,0,0), (1,1,0), (0,1,0), (0,1,1), (0,0,1), (1,0,1) and (1,1,1). Hexahedral grid 26 generated in block 24 comprises a plurality of hexahedrons and their corresponding vertices in the polycube domain. In some embodiments, hexahedral grid 26 generated in block 24 may also comprise the centroids of the corresponding hexahedrons. These centroids may be determined to be offset from corresponding hexahedron vertices by $[½,½,½]^T$. FIG. 6 shows the centroid 26B of exemplary hexahedron 26A at coordinates (½,½,½). The vertices and centroids of hexahedrons in polycube domain hexahedral grid 26 may be referred to herein as polycube domain hex grid points (or, for brevity, hex grid points).

Figure 7:
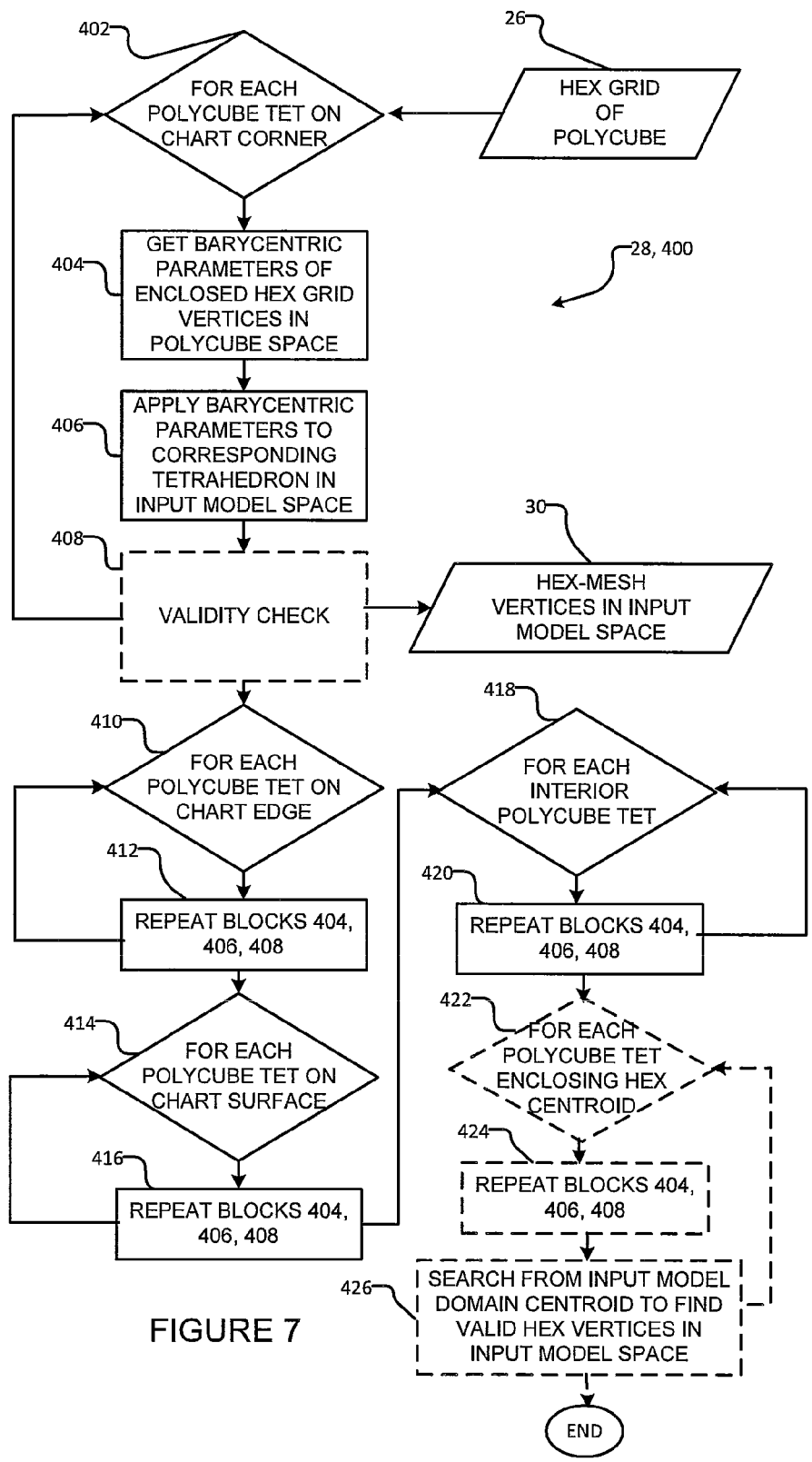
FIG. 7 schematically illustrates one method warping a hexahedral grid from the polycube domain to an input model domain which may be used in the FIG. 1 method according to a particular embodiment.

Method 10A then proceeds to block 28 which involves warping hexahedral grid 26 (in the polycube domain) to provide a corresponding hex-mesh 30 in the input model domain. FIG. 7 schematically illustrates one method 400 for implementing block 28 according to a particular embodiment. The general procedure of method 400 comprises, looping through the tetrahedrons of polycube 22 and for each such tetrahedron: parameterizing any polycube domain hex grid vertices in hexahedral grid 26 that are enclosed by the current polycube domain tetrahedron in terms of the vertices of the current polycube domain tetrahedron (e.g. in terms of barycentric coordinates (also referred to as barycentric parameters) and/or other suitable parameterizations of the vertices of the current polycube domain tetrahedron); applying the same parameters (e.g. barycentric parameters) to the vertices of the corresponding tetrahedron of input model 14 in the input model domain to thereby obtain a corresponding hex vertex in the input model domain; and optionally performing one or more validity checks on the input model domain hex vertex. The hex vertices in the input model domain corresponding to the polycube domain hex grid vertices are output by method 400 as hex-mesh 30.

In the illustrated embodiment of method 400 (FIG. 7), these procedures are applied to the polycube domain tetrahedrons in a particular order, although this is not necessary. In the description of method 400 (FIG. 7) that follows, it is assumed (without loss of generality) that the parameterization of polycube domain hex grid vertices in terms of the vertices of the corresponding polycube domain tetrahedrons involves the use of barycentric parameters. In some embodiments, other additional or alternative parameterizations could be used for this purpose.

Method 400 starts in block 402 which performs a loop involving blocks 404, 406 and optional block 408 for each polycube domain tetrahedron that corresponds to (e.g. encloses) a polycube vertex (in hexahedral grid 26) corresponding to a chart corner. For the current polycube domain tetrahedron of each iteration, block 404 comprises determining barycentric parameters for any polycube domain hex grid vertices in hexahedral grid 26 that are enclosed by the current polycube domain tetrahedron in terms of the tet vertices of the current polycube domain tetrahedron. While not explicitly shown in FIG. 7, block 404 may optionally comprise checking whether a polycube domain hex grid vertex enclosed by the current polycube domain tetrahedron is within the boundaries of the object in the polycube domain. If the polycube domain hex grid vertex enclosed by the current polycube domain tetrahedron is outside of the boundaries of the object in the polycube domain, then the polycube hex grid vertex may be discarded.

Once the block 404 barycentric parameters are obtained for any enclosed polycube domain hex vertices, block 406 involves applying these same barycentric parameters to the tet vertices of the input model domain tetrahedron corresponding to the current polycube domain tetrahedron to thereby obtain corresponding hex vertices in the input model domain. Such input model domain hex vertices (i.e. the result of application of the barycentric parameters in block 406) may be hex vertices in the output hex-mesh 30 which correspond to the polycube domain hex vertices enclosed by the current polycube domain tetrahedron. That is, block 406 involves establishing a mapping between the polycube domain hex-grid vertices and corresponding input model domain hex-grid vertices in hex-mesh 30.

Optional block 408 may involve application of one or more validity checks which may be used to address potential bijectivity issues and/or other possible artifacts with the mapping between polycube domain and input model domain hex vertices. Optional block 408 is described in more detail below.

After completing the block 402 loop (including blocks 404, 406 and 408) for each polycube domain tetrahedron corresponding to a chart corner, method 400 proceeds to block 410 which performs a loop involving the procedures of block 412 for each polycube domain tetrahedron corresponding to a chart edge. The procedures of block 412 correspond to the above-described procedures of blocks 404, 406 and 408 for the polycube domain tetrahedrons corresponding to chart edges. Method 400 then proceeds to block 414 which performs a loop involving the procedures of block 416 for each polycube domain tetrahedron corresponding to a chart surface. The procedures of block 416 correspond to the above-described procedures of blocks 404, 406 and 408 for the polycube domain tetrahedrons corresponding to chart surfaces. Method 400 then proceeds to block 418 which performs a loop involving the procedures of block 420 for each polycube domain hex tetrahedron corresponding to an interior of polycube representation 22. The procedures of block 420 correspond to the above-described procedures of blocks 404, 406 and 408 for the polycube domain tetrahedrons corresponding to the interior of polycube representation 22.

The output of method 400 may come from each iteration of block 408 (including those iterations of block 408 performed in bloc 412, 416 and 420) and may comprise a set of hex-mesh vertices 30 in the input model domain. While not explicitly shown in method 400, the output of method 400 may also comprise an indication of which hex-mesh vertices 30 correspond to each hexahedron in hex-mesh 30. For example, method 400 may output, for each hexahedron, a list of which hex-mesh vertices correspond to the hexahedron.

As discussed above, optional block 408 may involve application of one or more validity checks which may be used to address potential bijectivity issues and/or other possible artifacts with the mapping between polycube domain and input model domain hex vertices. While the order of processing the polycube domain tetrahedrons in the illustrated embodiment of method 400 is optional, the inventors have determined that processing the polycube domain tetrahedrons in the order shown in method 400 (i.e. tetrahedrons corresponding to chart corner vertices, followed by tetrahedrons corresponding to chart edge vertices, followed by tetrahedrons corresponding to chart surface vertices, followed by tetrahedrons corresponding to an interior of polycube 22) can also help to overcome bijectivity issues as between polycube representation 22 and output hex-mesh 30.

In some circumstances, more than one polycube domain tetrahedron encloses a polycube domain point having an integer coordinate(s). Each such polycube domain tetrahedron will generate a corresponding polycube domain hex grid vertex and will map (via the procedures of blocks 404 and 406) to a corresponding input domain hex vertex. The aforementioned optional block 408 validity checks may be used to reject or otherwise suppress input domain hex grid vertices that are determined to invalid. In some embodiments, a block 408 validity check may comprise, for two or more polycube domain tetrahedrons which enclose a particular integer coordinate polycube domain point: checking whether the corresponding two or more input domain hex grid vertices are the same or are within (i.e. less than) a threshold path length distance apart from one another; and, if the corresponding two or more input domain hex grid vertices are the same or are within (i.e. less than) a threshold path length distance apart from one another, then rejecting or suppressing the second (and/or subsequent) input domain hex grid vertices (determined in the order of method 400) from hex-mesh 30. If on the other hand, it is determined in block 408 that the second (and/or subsequent) input domain hex grid vertices are separated from one another by more than the threshold path length distance, then block 408 may comprise maintaining the second (and/or subsequent) input domain hex grid vertices in hex-mesh 30. This threshold path length difference may be user-configurable.

As discussed above, in some embodiments block 404 may comprise checking whether a polycube domain hex grid vertex enclosed by the current polycube domain tetrahedron is within the boundaries of the object in the polycube domain and possibly discarding the polycube domain hex grid vertex if it is outside of the boundaries of the object in the polycube domain. In some embodiments, this validity check may be performed as part of block 408. In some embodiments, this block 408 validity check may also comprise, before discarding any hex grid vertex, determining whether the corresponding input domain hex grid vertex is within (i.e. less than) a threshold path length distance from another input (previously determined) domain hex grid vertex and only discarding the vertex if the corresponding input domain hex grid vertex is within (i.e. less than) the threshold path length distance apart another input domain hex grid vertex.

In some embodiments, method 400 may also comprise optional blocks 422, 424 and 426 which may be used to help determine the correspondence between hex-mesh vertices 30 output in each iteration of block 408 and corresponding hexahedrons. Block 422 involves performing a loop involving the procedures of blocks 424 and 426 for each polycube domain tetrahedron enclosing a polycube domain hex grid centroid. The procedures of block 424 correspond to the above-described procedures of blocks 404, 406 and 408, except that the polycube domain hex grid vertices are replaced with polycube domain hex grid centroids. In each iteration, the output of block 424 is an input model domain hex grid centroid point corresponding to a polycube domain hex grid centroid. After determining the block 424 input domain centroid, method 400 proceeds to optional block 426. Optional block 426 involves performing a search (originating from the current block 424 input domain centroid) for the closest eight input domain hex-mesh vertices 30 (i.e. hex mesh vertices 30 output from each iteration of block 408 in the preceding method 400 procedures) which satisfy the criteria of a valid hexahedron. The block 426 search may be confined to the volume of input model 14. Block 426 may involve assigning a correspondence between the current block 424 input domain centroid and the eight input domain hex-mesh vertices 30 located in block 426. In this manner, optional blocks 422, 424 and 426 may help to establish the correspondence between the hexahedrons in hex-mesh 30 and the hex-mesh vertices corresponding to each hexahedron.

Returning to FIG. 1, hex-mesh 30 generated in block 28 (method 400) may be the output of method 10A. However, in some embodiments, hex-mesh 30 may be further processed in block 32 using one or more known hex-mesh post-processing techniques which may improve the characteristics of hex-mesh 30 for particular applications. One post processing procedure that may be applied to hex-mesh 30 in block 32 involves the addition of a padding layer which may be formed by extruding surface quads to form hexes. This padding layer provides extra degrees of freedom when hexahedra from the edges or vertices of polycube 22 map to smooth parts of input model 14. Suitable padding procedure(s) are described, for example, in SHEPHERD J.: *Topologic and geometric constraint-based hexahedral mesh generation.* PhD thesis, University of Utah, 2007 and MARECHAL L.: Advances in octree-based all-hexahedral mesh generation: handling sharp features. *In Proc. International Meshing Roundtable.* 2009, which are hereby incorporated herein by reference.

Another post processing procedure that may be applied to hex-mesh 30 in block 32 involves mesh optimization, which shifts mesh vertices to improve quality, while leaving connectivity unchanged. The vertices of hex-mesh 30 may be repositioned individually to maximize the minimum quality of adjacent elements, followed by shape-improvement with commercially available software, such as Mesquite™. Such mesh optimization procedures are described, for example, in BREWER M., DIACHIN L. F., KNUPP P. M., LEURENT T., MELANDER D.: The mesquite mesh quality improvement toolkit. *In Proc. Intl. Meshing Roundtable* (2003) which is hereby incorporated herein by reference.

The output of the optional post-processing procedures of block 32 is a post-processed hex-mesh 34.

FIG. 8 shows a schematic diagram of a system 500 which may be configured to implement all or part of any of the methods described herein according to an example embodiment. System 500 comprises a display 502, user input devices 504 and a computer system 506 comprising a processor 508. Processor 508 may have access to software 510 which may be used to configure processor 508 to perfume all or part of any of the methods described herein. In some embodiments, processor 508 may be configured to perform all or part of any of the methods described herein using a combination of hardware and software 510. In some embodiments, processor 510 may have access to computer-readable medium 512 which may comprise suitable codified instructions which, when executed by processor 510, cause processor 510 to perform any all or part of the methods described herein.

Computer system 506, processor 510 and components thereof may comprise hardware, software, firmware or any combination thereof. Processor 510 may comprise one or more microprocessors, digital signal processors, graphics processors, field programmable gate arrays, and/or the like. Components of system 500 may be combined or subdivided, and components of system 500 may comprise sub-components shared with other components of system 500. Components of system 500 may be physically remote from one another. For example, processor 510 may be instantiated in a programmed server computer which communicates with display 502 via the internet or another network.

Where a component is referred to above (e.g., a system, display, processor, etc.), unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Where the context permits, words in the above description using the singular or plural number may also include the plural or singular number respectively. The word "or," in reference to a list of two or more items, covers all of the following interpretations of the word: any of the items in the list, all of the items in the list, and any combination of the items in the list.

The above detailed description of example embodiments is not intended to be exhaustive or to limit this disclosure and claims to the precise forms disclosed above. While specific examples of, and examples for, embodiments are described above for illustrative purposes, various equivalent modifications are possible within the scope of the technology, as those skilled in the relevant art will recognize.

These and other changes can be made to the system in light of the above description. While the above description describes certain examples of the technology, and describes the best mode contemplated, no matter how detailed the above appears in text, the technology can be practiced in many ways. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above description section explicitly and restrictively defines such terms. Accordingly, the actual scope of the technology encompasses not only the disclosed examples, but also all equivalent ways of practicing or implementing the technology under the claims.

While a number of exemplary aspects and embodiments are discussed herein, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for generating a polycube representation of an input object, the method comprising:
receiving, at a processor, an input volumetric representation of the input object;
deforming, by the processor, the input volumetric representation to provide a deformed object representation;
extracting, by the processor, a polycube representation of the object from the deformed object representation, the polycube representation comprising a solid figure made of cubes joined face to face, the solid figure comprising axis-aligned surface planes which having normal vectors that align with one of six directions (±X,±Y,±Z) aligned with a set of global Cartesian axes;
wherein deforming, by the processor, the input volumetric representation to provide the deformed object representation comprises effecting, by the processor, a tradeoff between competing objectives of: deforming the input volumetric representation in a manner which provides surfaces having normal vectors closely aligned with one of the six directions aligned with the set of global Cartesian axes; and deforming the input volumetric representation in a manner which provides low-distortion deformations;
wherein deforming, by the processor, the input volumetric representation to provide the deformed object representation comprises starting with the input volumetric representation as a current model and then iteratively deforming the current model, wherein each iteration comprises effecting, by the processor, a tradeoff between competing objectives of: deforming the current model in a manner which provides surfaces having normal vectors closely aligned with one of the six directions aligned with the set of global Cartesian axes; and deforming the current model in a manner which provides low-distortion deformations to the current model in each iteration;
wherein the input volumetric representation comprises a polyhedral-mesh representation of the input object, the polyhedral-mesh representation comprising a plurality of notional polyhedrons, each notional polyhedron comprising a corresponding plurality of vertices, a plurality of linear edges that extend between corresponding pairs of vertices and a plurality of polygonal faces defined by corresponding pluralities of edges; and
wherein iteratively deforming the current model comprises, in each iteration:
for each surface vertex of the current model, determining, by the processor, a surface vertex anchor rotation that would align a normal vector associated with the surface vertex with a corresponding one of the six directions aligned with the set of global Cartesian axes;
performing, by the processor, a computational optimization which determines interior rotations for each of the interior vertices of the current model and which is permitted to modify the surface vertex anchor rotations to provide updated surface rotations for each of the surface vertices of the current model;
applying, by the processor, the interior rotations to the interior vertices and the updated surface rotations to the surface vertices to determine an iteration output model with new positions for the vertices; and
setting the iteration output model to be the current model for the next iteration.

2. A method according to claim 1 wherein, in each iteration, performing, by the processor, the computationally optimization comprises minimizing an objective function, the objective function comprising: a first cost function that assigns cost to changing the surface vertex anchor rotations to provide updated surface rotations; and a second cost function that assigns cost positive correlated with an amount of change to the vertices by application of the interior rotations and updated surface rotations as compared to the input volumetric representation.

3. A method according to claim 1 wherein, in each iteration, performing, by the processor, the computationally optimization comprises minimizing an objective function, the objective function comprising: a first cost function that assigns cost to changing the surface vertex anchor rotations to provide updated surface rotations; and a second cost function that assigns cost positive correlated with an amount of change to the vertices by application of the interior rotations and updated surface rotations as compared to the current model.

4. A method according to claim 1 wherein, in each iteration, performing, by the processor, the computational optimization comprises minimizing an objective function, the objective function comprising: a first cost function that assigns cost to changing the surface vertex anchor rotations to provide updated surface rotations; and a second cost function that assigns cost positively correlated with an amount of change between the rotations of adjacent vertices.

5. A method according to claim 1 comprising, upon reaching a loop exit criteria, terminating the iterative deformation of the current model and setting the iteration output model to be the deformed object representation.

6. A method according to claim 2 comprising assigning different relative weights to the first and second cost functions.

7. A method according to claim 2 wherein applying, by the processor, the interior rotations to the interior vertices and the updated surface rotations to the surface vertices to determine the iteration output model comprises solving a Poisson equation to yield the new positions of the vertices.

8. A method according to claim 2 wherein applying, by the processor, the interior rotations to the interior vertices and the updated surface rotations to the surface vertices to determine the iteration output model comprises solving for new positions ($v_i$ and $v_j$) of the $i^{th}$ and $j^{th}$ vertices in the iteration output model by minimizing:

$$\sum_{i,j} \left( (v_j - v_i) - \left( \frac{\nabla_i + \nabla_j}{2} \right) \cdot (\tilde{v}_i - \tilde{v}_j) \right)^2$$

over all mesh edges (i, j);
where: $\tilde{v}_i$ and $\tilde{v}_j$ are the positions of the $i^{th}$ and $j^{th}$ vertices in the current model; and $\nabla_i$ and $\nabla_j$ are the rotations for the $i^{th}$ and $j^{th}$ vertices.

9. A method according to claim 6 wherein the different relative weights are user-configurable.

10. A method according to claim 7 wherein, for an $i^{th}$ vertex, the Poisson equation has the form:

$$v_i - \frac{1}{N}\sum_{j=1}^{N} v_j = \frac{1}{N}\sum_{j=1}^{N} \frac{\nabla_i + \nabla_j}{2} \cdot (\tilde{v}_i - \tilde{v}_j)$$

where: $\tilde{v}_i$ and $\tilde{v}_j$ are the positions of the $i^{th}$ and $j^{th}$ vertices in the current model; $v_i$ and $v_j$ are the new positions of the $i^{th}$ and $j^{th}$ vertices in the iteration output model; $\nabla_i$ and $\nabla_j$ are the rotations for the $i^{th}$ and $j^{th}$ vertices; and the index j runs over the N immediate neighbors of the vertex i.

11. A method for generating a polycube representation of an input object, the method comprising:
receiving, at a processor, an input volumetric representation of the input object;
deforming, by the processor, the input volumetric representation to provide a deformed object representation;
extracting, by the processor, a polycube representation of the object from the deformed object representation, the polycube representation comprising a solid figure made of cubes joined face to face, the solid figure comprising axis-aligned surface planes which having normal vectors that align with one of six directions ($\pm X, \pm Y, \pm Z$) aligned with a set of global Cartesian axes;
wherein deforming, by the processor, the input volumetric representation to provide the deformed object representation comprises effecting, by the processor, a tradeoff between competing objectives of: deforming the input volumetric representation in a manner which provides surfaces having normal vectors closely aligned with one of the six directions aligned with the set of global Cartesian axes; and deforming the input volumetric representation in a manner which provides low-distortion deformations;
wherein deforming, by the processor, the input volumetric representation to provide the deformed object representation comprises starting with the input volumetric representation as a current model and then iteratively deforming the current model, wherein each iteration comprises effecting, by the processor, a tradeoff between competing objectives of: deforming the current model in a manner which provides surfaces having normal vectors closely aligned with one of the six directions aligned with the set of global Cartesian axes; and deforming the current model in a manner which provides low-distortion deformations to the current model in each iteration;
wherein the input volumetric representation comprises a polyhedral-mesh representation of the input object, the polyhedral-mesh representation comprising a plurality of notional polyhedrons, each notional polyhedron comprising a corresponding plurality of vertices, a plurality of linear edges that extend between corresponding pairs of vertices and a plurality of polygonal faces defined by corresponding pluralities of edges; and
wherein extracting, by the processor, the polycube representation from the deformed object representation comprises:
labeling, by the processor, each surface face of the deformed object representation with a corresponding one of the six directions aligned with the set of global Cartesian axes;
segmenting, by the processor, the surface faces of the deformed object into charts, each chart comprising a contiguous patch of surface faces having the same label; and
warping, by the processor, the deformed object representation to output a polycube representation that complies with polycube constraints, wherein warping the deformed object representation comprises adjusting the positions of the vertices of the deformed object representation to obtain updated vertex positions for the polycube representation, such that, for each chart, the updated vertex positions of the surface vertices associated with the chart are constrained to a corresponding plane, the corresponding plane having a normal vector aligned with the one of the six directions aligned with the set of global Cartesian axes corresponding to the chart label.

12. A method according to claim 11 wherein labeling, by the processor, each surface face comprises, for each surface face, assigning, by the processor, the surface face a label with a corresponding one of the six directions that is most closely aligned with a surface normal vector of the surface face.

13. A method according to claim 11 wherein segmenting, by the processor, the surface faces of the deformed object into charts comprises determining if one or more of the charts meets relabeling criteria and, if so, relabeling the one or more of the charts.

14. A method according to claim 11 wherein segmenting, by the processor, the surface faces of the deformed object into charts comprises, determining if a particular surface face of the deformed object on a chart boundary has two or more immediately neighboring surface faces which share a common label different from the label of the particular surface face and, if so, relabeling the particular surface face to share the common label of its neighbors.

15. A method according to claim 11 wherein warping, by the processor, the deformed object representation to output the polycube representation that complies with polycube constraints comprises performing, by the processor, a computational constrained optimization which determines the updated vertex positions for the polycube representation wherein, for each chart, a constraint is that the updated vertex positions of the surface vertices associated with the chart are constrained to the corresponding plane.

16. A method according to claim 11 comprising:
further adjusting the updated vertex positions of the polycube representation by quantizing the surface vertices of the polycube representation, such that for each chart, the surface vertices associated with the chart and the corresponding plane have common integer chart coordinates along one of the global Cartesian axes aligned with the chart label; and
further adjusting the updated vertex positions of the polycube representation to accommodate the quantized surface vertices while, for each chart, maintaining the common integer chart coordinates for the surface vertices associated with the chart.

17. A method according to claim 13 wherein the relabeling criteria comprise one or more of:
a chart bounded by two or fewer chart edges;
a chart that has a surface area less than a threshold surface area; and
a chart that has a linear dimension less than a threshold linear dimension.

18. A method according to claim 15 wherein performing, by the processor, the computational constrained optimization comprises minimizing a warping objective function, the warping objective function comprising a first cost function that assigns cost that is positively correlated with changes between the positions of the vertices of the deformed object representation and the updated vertex positions of the polycube representation.

19. A method according to claim 18 wherein the warping objective function comprises a second cost function that assigns cost to changing a distance between one or more pairs of charts labeled with either the positive or negative direction of the same global Cartesian axis.

20. A method according to claim 19 wherein, for each pair of charts labeled with either the positive or negative direction of the same Cartesian axis, the cost of the second cost function assigned to changing the distance between the pair of charts is weighted according to a Gaussian function of the distance between the pair of charts.

21. A method according to claim 16 wherein further adjusting the updated vertex positions of the polycube representation to accommodate the quantized surface vertices comprises solving a Laplace equation to determine the further adjusted updated vertex positions of the polycube representation.

22. A method according to claim 21 comprising discretizing the Laplace equation using two-dimensional mean value coordinates for the surface vertices of the polycube representation and three-dimensional mean value coordinates for interior vertices of the polycube representation.

23. A method for generating a hex-mesh representation of an input object, the method comprising:
generating, by the processor, a polycube representation of the input object in accordance with a method comprising:
receiving, at a processor, an input volumetric representation of the input object;
deforming, by the processor, the input volumetric representation to provide a deformed object representation;
extracting, by the processor, a polycube representation of the object from the deformed object representation, the polycube representation comprising a solid figure made of cubes joined face to face, the solid figure comprising axis-aligned surface planes which having normal vectors that align with one of six directions (±X,±Y,±Z) aligned with a set of global Cartesian axes;
wherein deforming, by the processor, the input volumetric representation to provide the deformed object representation comprises effecting, by the processor, a tradeoff between competing objectives of: deforming the input volumetric representation in a manner which provides surfaces having normal vectors closely aligned with one of the six directions aligned with the set of global Cartesian axes; and deforming the input volumetric representation in a manner which provides low-distortion deformations; and
determining, by the processor, a hex-mesh representation of the input object based on the polycube representation of the input object;
wherein using the generated polycube representation to determine a hex-mesh representation of the input object comprises:
generating, by the processor, parameterizations of points on a hexahedral grid corresponding to the polycube representation in a polycube domain; and
applying the parameterizations to the input volumetric representation in an input model domain to form the hex-mesh representation;
wherein the points on the hexahedral grid corresponding to the polycube representation in the polycube domain comprise the vertices of hexahedrons in a hex-mesh in the polycube domain and wherein applying the parameterizations to the input volumetric representation in the input model domain generates corresponding vertices of hexahedrons in the input model domain; and
wherein using the generated polycube representation to determine a hex-mesh representation of the input object comprises:
generating, by the processor, parameterizations of centroids of the hexahedrons of the hex-mesh in the polycube domain; and
applying the parameterizations of the centroids to the input volumetric representation in the input model domain to obtain centroids in an input model domain; and
determining vertices of the hexahedrons in the input model domain based at least in part on the centroids in the input model domain.

24. A computer-implemented method for generating a hexahedral mesh of an input object, comprising:
(a) receiving a computer-readable volumetric representation of the input object having a plurality of surface and interior points;
(b) computationally deforming the volumetric representation into a deformed object by:
(i) for each surface point of the volumetric representation, determining a preferred rotation value that aligns a surface normal at the surface point with a selected Cartesian axis;
(ii) determining a rotation field comprising a rotation value for each point of the volumetric representation, as a function of providing a selected trade-off between minimal variability of rotation values of selected nearby points and satisfying the preferred rotation values determined for the plurality of surface points; and
(iii) applying rotation values coherently throughout the volumetric representation by applying Poisson integration of the determined rotation field thereby computing new positions of the points and creating the deformed object;
(c) computationally extracting a polycube from the deformed object by:
(i) associating each surface face of the deformed object with a Cartesian axis to form contiguous surface patches which correspond to surface faces of the polycube, then
(ii) warping the deformed object using positional constraints to align each contiguous surface patch with an associated Cartesian axis and to enforce planarity; and
(d) generating a computer-readable hexahedral mesh of the input object by: generating a hexahedral grid of the polycube then warping the grid to the input object by using an explicit correspondence between the polycube and the volumetric representation.

25. A method as claimed in claim 24 wherein steps (b)(i) to (b)(iii) are repeated until the points of the deformed object are substantially stationary between iterations of steps (b)(i) to (b)(iii).

26. A method as claimed in claim 24 wherein the volumetric representation comprises a tetrahedral mesh comprising a plurality of tetrahedrals, the points are the vertices of the tetrahedrals and, in step (c), associating each surface face of the deformed object with the Cartesian axis to form contiguous surface patches comprises labeling the surface triangle faces of surface tetrahedrals according to the closest Cartesian axis to the normal vectors of the surface triangle faces and grouping similarly labeled and contiguous surface triangle faces into the surface patches.

27. A method as claimed in claim 24 further comprising, in step (c), detecting multi-orientation polycube faces and replacing each detected multi-orientation polycube face with a separating polycube face, wherein the separating polycube face is introduced along a splitting boundary of the multi-orientation polycube face.

28. A method as claimed in claim 24 further comprising, in step (c), detecting highly non-planar polycube faces, and replacing each detected non-planar polycube face with a separating polycube face, wherein the separating surface patch is introduced along a lowest cost cut path of the highly non-planar polycube face.

29. A method as claimed in claim 24 wherein, in step (c), the positional constraints comprise soft distance preservation constraints which preserve the ordering and distance between nearby polycube faces aligned to the same axis.

* * * * *